(12) United States Patent
Satou et al.

(10) Patent No.: US 9,047,435 B2
(45) Date of Patent: Jun. 2, 2015

(54) MULTI-BOARD DESIGN APPARATUS, MULTI-BOARD DESIGN METHOD, PROGRAM AND COMPUTER-READABLE RECORDING MEDIUM

(71) Applicant: Zuken Inc., Kanagawa (JP)

(72) Inventors: Ryouta Satou, Kanagawa (JP); Takahiko Maehashi, Kanagawa (JP)

(73) Assignee: ZUKEN INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/114,415

(22) PCT Filed: Oct. 2, 2012

(86) PCT No.: PCT/JP2012/075457
§ 371 (c)(1),
(2) Date: Oct. 28, 2013

(87) PCT Pub. No.: WO2013/058095
PCT Pub. Date: Apr. 25, 2013

(65) Prior Publication Data
US 2014/0223402 A1      Aug. 7, 2014

(30) Foreign Application Priority Data

Oct. 20, 2011   (JP) ................................. 2011-230415

(51) Int. Cl.
*G06F 17/50*        (2006.01)
(52) U.S. Cl.
CPC ........ *G06F 17/5077* (2013.01); *G06F 17/5045* (2013.01); *G06F 17/50* (2013.01); *H01L 2224/73265* (2013.01); *G06F 17/5068* (2013.01)

(58) Field of Classification Search
CPC . G06F 17/50; G06F 17/5045; G06F 17/5068; G06F 17/5077; H01L 2224/73265
USPC ......... 716/111, 112, 119, 123, 126, 131, 137, 716/138, 139
See application file for complete search history.

(56) References Cited

U.S. PATENT DOCUMENTS 5,295,081 A * 3/1994 Habra ........................... 716/131
5,633,804 A * 5/1997 Bever ........................... 716/102

(Continued)

FOREIGN PATENT DOCUMENTS

EP       2 073 134 A1    6/2009
JP       03-027474       2/1991

(Continued)

*Primary Examiner* — Helen Rossoshek
(74) *Attorney, Agent, or Firm* — Muncy, Geissler, Olds & Lowe, P.C.

(57) ABSTRACT

In order to always maintain connection relationships between substrates of the multi-board, a multi-board design apparatus for designing a multi-board comprising a plurality of substrates which are electrically connected is made to have: setting means by which a designer sets connection information indicating a connection relationship between each substrate configuring the multi-board; modification information detection means by which, when editing in an arbitrary substrate configuring the multi-board, modified content resulting from the editing is detected as modification information; and connection information modification means which, on the basis of the modification information which has been detected by the modification which has been detected by the modification information detection means, modifies the connection information which has been set in the setting means so as to maintain electrical connection relationships between each of the substrates in the multi-board.

12 Claims, 26 Drawing Sheets

(56) References Cited

U.S. PATENT DOCUMENTS

| | | | |
|---|---|---|---|
| 5,691,913 A * | 11/1997 | Tsuchida et al. | 716/122 |
| 5,847,968 A * | 12/1998 | Miura et al. | 716/123 |
| 6,298,319 B1 * | 10/2001 | Heile et al. | 703/26 |
| 6,587,989 B2 * | 7/2003 | Rosenbaum et al. | 716/102 |
| 6,651,225 B1 * | 11/2003 | Lin et al. | 716/113 |
| 6,691,296 B1 * | 2/2004 | Nakayama et al. | 716/122 |
| 6,708,313 B2 * | 3/2004 | Pfeil et al. | 716/102 |
| 7,459,640 B2 * | 12/2008 | Adriaenssens et al. | 174/258 |
| 7,464,360 B2 * | 12/2008 | Haji-Aghajani et al. | 716/102 |
| 7,480,606 B2 * | 1/2009 | Tseng et al. | 703/14 |
| 7,516,435 B2 * | 4/2009 | Petunin et al. | 716/137 |
| 7,546,571 B2 * | 6/2009 | Mankin et al. | 716/137 |
| 7,587,695 B2 * | 9/2009 | Petunin et al. | 716/137 |
| 7,847,567 B2 * | 12/2010 | Koh et al. | 324/754.07 |
| 7,896,692 B2 * | 3/2011 | Gibson et al. | 439/540.1 |
| 8,185,849 B2 * | 5/2012 | Nakamura | 716/103 |
| 8,214,192 B2 * | 7/2012 | Durand et al. | 703/22 |
| 8,510,698 B2 * | 8/2013 | Kumagai | 716/119 |
| 8,516,399 B2 * | 8/2013 | Paris et al. | 716/51 |
| 8,525,849 B2 * | 9/2013 | Nakamura et al. | 345/619 |
| 8,650,528 B2 * | 2/2014 | Nakamura | 716/138 |
| 8,856,722 B2 * | 10/2014 | Sugaya et al. | 716/137 |
| 2003/0131326 A1 | 7/2003 | Pfeil | |
| 2006/0101368 A1 * | 5/2006 | Kesarwani et al. | 716/11 |
| 2006/0212838 A1 * | 9/2006 | Carson et al. | 716/17 |
| 2006/0236281 A1 | 10/2006 | Furukawa | |
| 2008/0005713 A1 * | 1/2008 | Singh et al. | 716/11 |
| 2008/0141194 A1 * | 6/2008 | Kumagai | 716/5 |
| 2008/0142352 A1 * | 6/2008 | Wright | 200/600 |
| 2008/0301600 A1 * | 12/2008 | Kumagai | 716/5 |
| 2010/0005438 A1 | 1/2010 | Nakamura | |
| 2010/0199240 A1 * | 8/2010 | Pfeil et al. | 716/4 |
| 2011/0016444 A1 * | 1/2011 | Paris et al. | 716/111 |
| 2013/0227509 A1 * | 8/2013 | Chang et al. | 716/111 |

FOREIGN PATENT DOCUMENTS

| | | | |
|---|---|---|---|
| JP | 2003-256490 | | 9/2003 |
| JP | 2005-513598 | | 5/2005 |
| JP | 2006-260288 | | 9/2006 |
| JP | 2006252303 A | * | 9/2006 |
| JP | 2009289208 A | * | 12/2009 |
| WO | WO-03/050751 A1 | | 6/2003 |
| WO | WO-2008/047650 A1 | | 4/2008 |

* cited by examiner

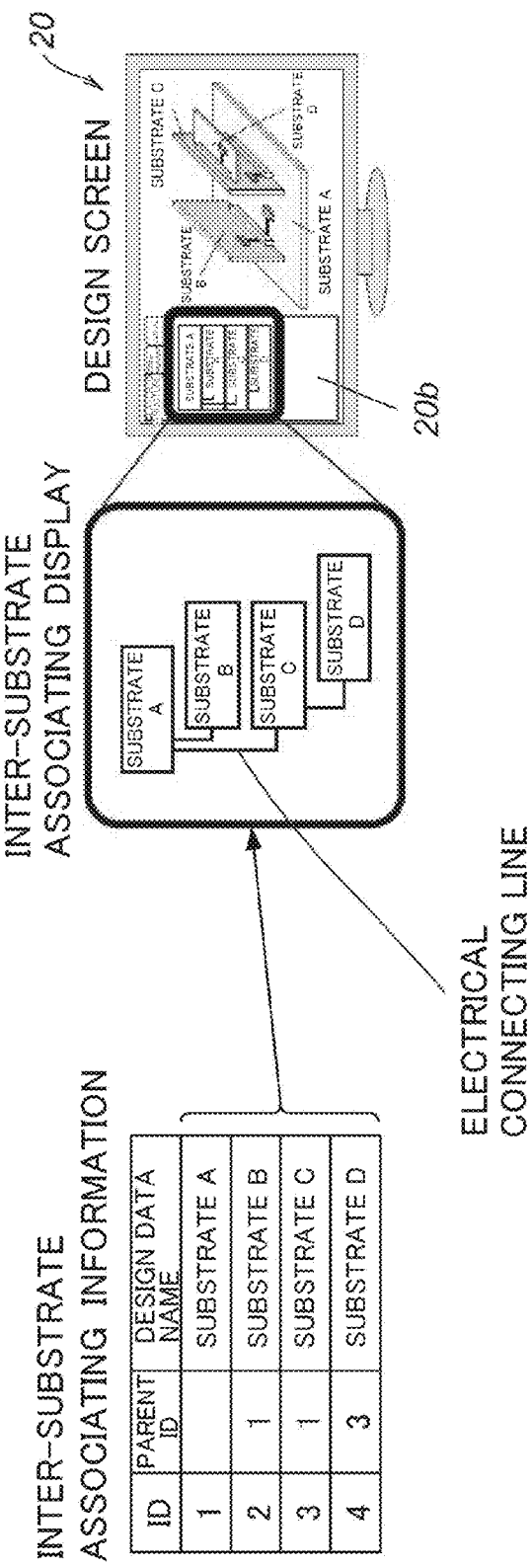

AUTOMATICALLY GENERATED CONNECTION INFORMATION (RATSNEST)

SUBSTRATE B

SUBSTRATE A

STATE HAVING NO AUTOMATICALLY GENERATED CONNECTION INFORMATION

STATE WHERE CONNECTION INFORMATION WAS AUTOMATICALLY GENERATED

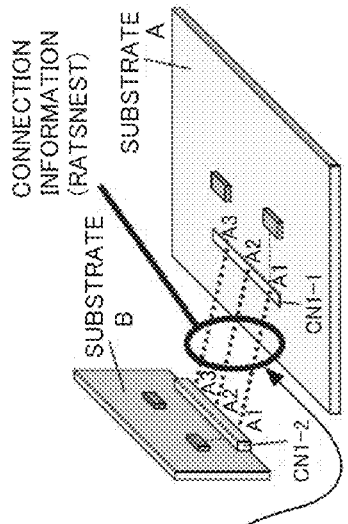

◉ : EDITING FORBIDDEN MARK

BEFORE CHANGE

AFTER CHANGE

BEFORE CHANGE

AFTER CHANGE

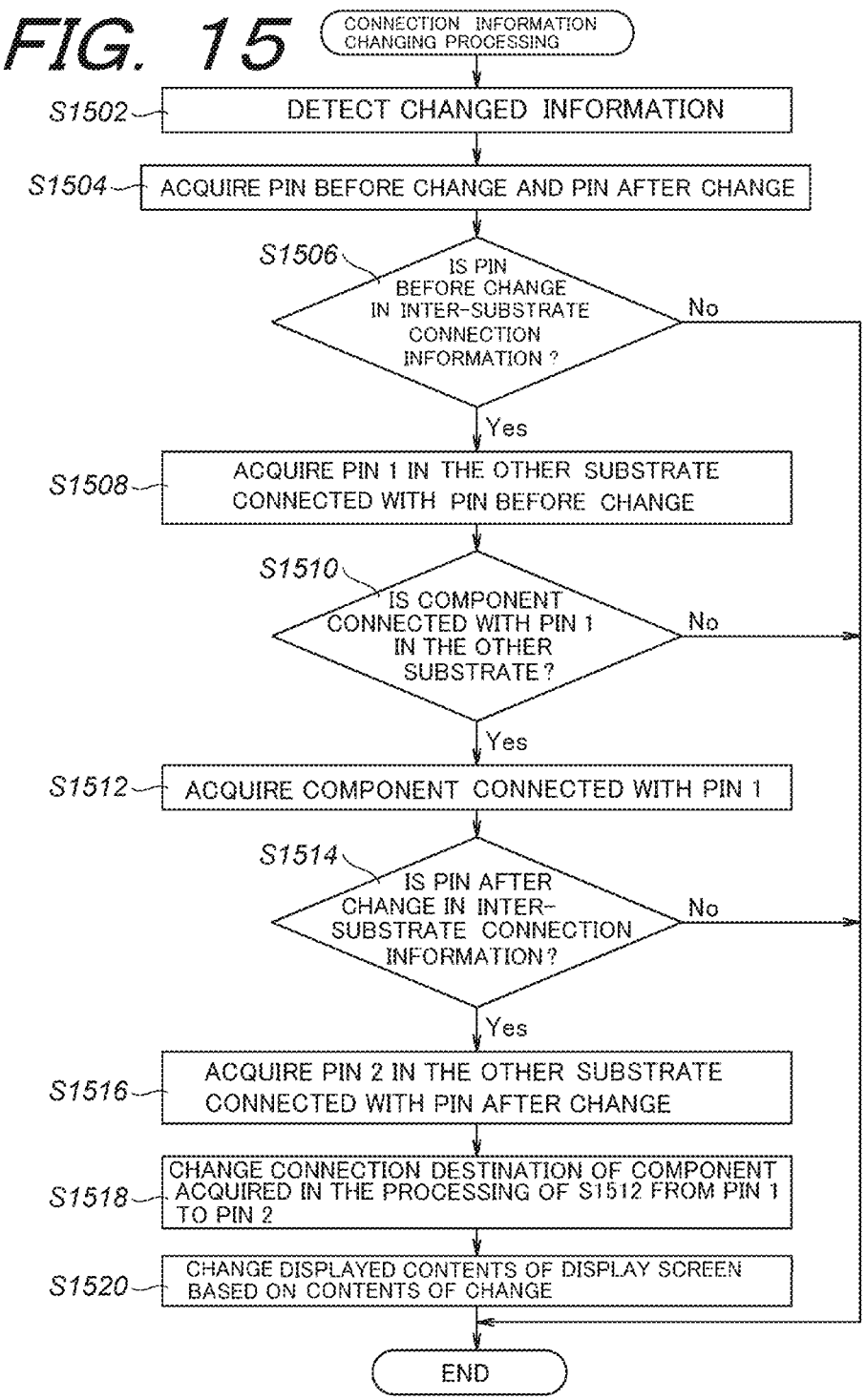

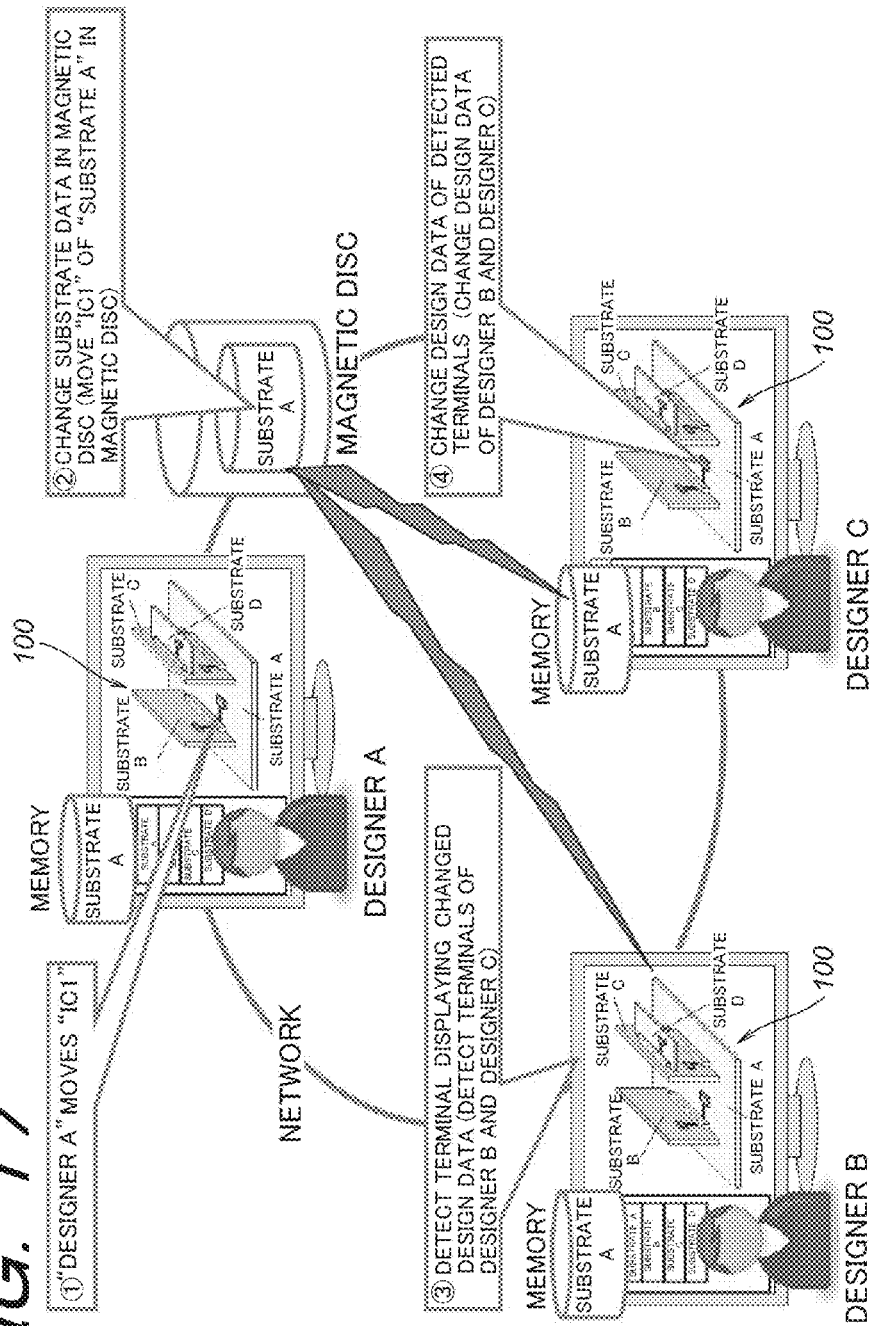

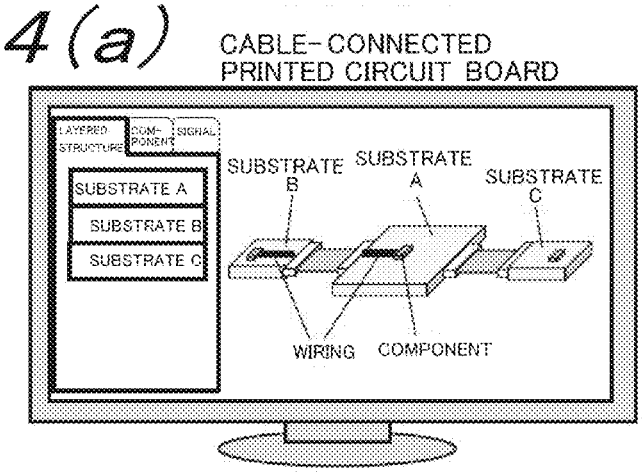
FIG. 24(a) CABLE-CONNECTED PRINTED CIRCUIT BOARD
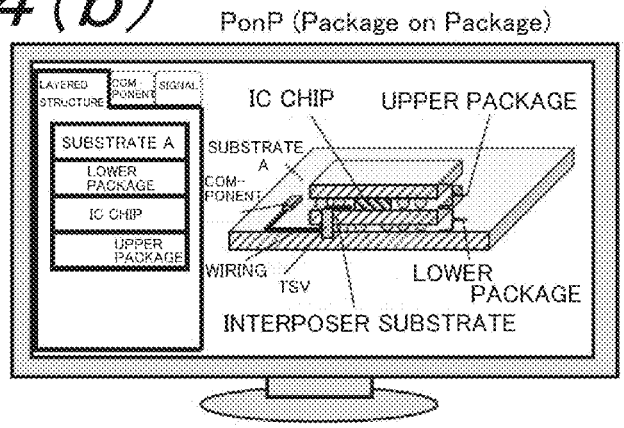
FIG. 24(b) PonP (Package on Package)
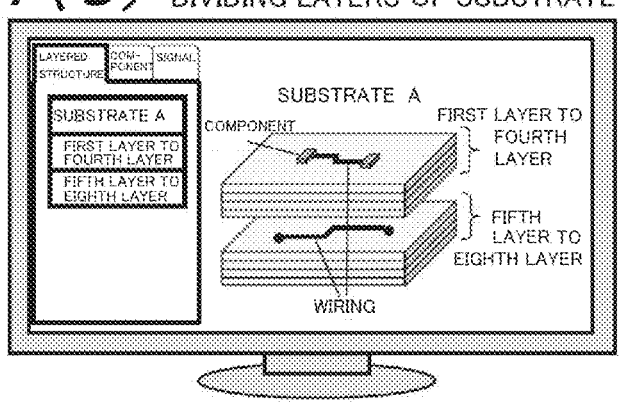
FIG. 24(c) DIVIDING LAYERS OF SUBSTRATE

MULTI-BOARD DESIGN APPARATUS, MULTI-BOARD DESIGN METHOD, PROGRAM AND COMPUTER-READABLE RECORDING MEDIUM

TECHNIQUE FIELD

The present invention relates to a multi-board design apparatus, a multi-board design method, a program and a computer-readable recording medium, and more particularly, the invention relates to a multi-board design apparatus which designs a multi-board made up of a plurality of substrates having electrical connection relationship, a multi-board design method, a program and a computer readable recording medium.

BACKGROUND TECHNOLOGY

Conventionally, in order to design a multi-board made up of a plurality of substrates having electrical connection relationship by utilizing electrical design CAD (Computer Aided Design) which performs electrical design of a substrate or the like, for example, it has been necessary to create connection information for connecting each substrate after each substrate was separately designed.

Specifically, in the case where a substrate A and a substrate B being constituent elements of the multi-board are connected by a connector, design of the substrate A, design of the substrate B and design of inter-substrate connection (i.e., design of a connected state of the substrates A, B by connectors) were performed separately (refer to FIG. 1(a)), and designed design information was saved in a magnetic disc to own each design information (refer to FIG. 1(b)).

It is to be noted that FIG. 1(a) shows a case where a component 1 is connected to a pin A3 of a connector 1 in the design of the substrate A, a component 2 is connected to a pin A3 of a connector 2 in the substrate B, a pin A1 of the connector 1 provided for the substrate A and a pin A1 of the connector 2 provided for the substrate B are connected, a pin A2 of the connector 1 and a pin A2 of the connector 2 are connected, and the pin A3 of the connector 1 and the pin A3 of the connector 2 are connected in the inter-substrate connection, in which the component 1 arranged for the substrate A is designed in a connected state with the component 2 arranged for the substrate B via the pin A3 of the connector 1 and the pin A3 of the connector 2.

In the design method of such a multi-board made up of a plurality of substrates, in the case where the arrangement position of the component 2 in the substrate B is changed from the state shown in FIG. 1(a) and a connection destination of the component 2 is changed to A1 of the connector 2 with the change for example (refer to FIG. 2), the connection destination of the component 1 provided for the substrate A had to be changed from the pin A3 of the connector 1 to the pin A1 in order to maintain connection relationship between the component 1 and the component 2.

However, in the design of the substrate A, substrate B and inter-substrate connection, a designer separately designed each item, so that a human-made error by the designer such as failing to changing the above-described connection destination of the component 1 or the like caused a case where the information of each design data did not cooperate with each other and connection relationship between the component 2 and the component 1 was not maintained, and connection relationship between the component 2 and the component 1 was not maintained.

Thus, connection relationship between the substrate A and the substrate B was not maintained, and a problem was pointed out that connection relationship between the substrate A and the substrate B being constituent elements of the multi-board could not be maintained.

Furthermore, in the case of performing each design for improving design efficiency by different designers, changed information had to be shared among a plurality of designers, and a problem was pointed out that the above-described human-made error became more prominent, and connection relationship between the substrate A and the substrate B being constituent elements of the multi-board could not be maintained.

It is to be noted that prior art that the present applicant knows at the point of filing a patent is not an invention known to the public through publication, so there is no prior art document information to be described in the present specification.

SUMMARY OF THE INVENTION

Problems to be Solved by the Invention

The present invention has been created in view of various problems that the above-described conventional technique has, and it is an object of the invention to provide a multi-board design apparatus, a multi-board design method, a program and a computer-readable recording medium in which connection relationship between constituent elements of the multi-board ("printed circuit board", "semiconductor package", "IC chip" or the like is exemplified as the "constituent element", but hereinafter, description should be made exemplifying the "printed circuit board", and the "printed circuit board" should be simply appropriately referred to as a "substrate") is always maintained.

Means for Solving the Problems

To achieve the above-described object, the present invention is a multi-board design apparatus that designs a multi-board in which a plurality of substrates are electrically connected, the apparatus has: setting means for setting connection information indicating electrical connection relationship between substrates, which constitutes the multi-board, by a designer; changed information detection means for, when editing in an arbitrary substrate which constitutes the multi-board is performed, detecting contents changed by the editing as changed information; and connection information changing means for changing connection information set in the setting means so as to maintain electrical connection relationship between substrates in the multi-board based on the changed information detected by the changed information detection means.

Further, the present invention is the above-described invention which has: component movement detection means for detecting an editing request (editing request indicates an operation by a designer such as moving a component, adding a component, deleting a component, etc.) of moving the component arranged for the first substrate to a second substrate as the changed information; and substrate connection changing means for changing connection relationship between the first substrate and the second substrate so as to maintain electrical connection relationship in the multi-board before and after editing regarding the editing request based on the changed information detected by the component movement detection means.

Further, the present invention is the above-described invention, in which the first substrate has a first pin and a second pin, the second substrate has a third pin connected to the first pin and a fourth pin connected to the second pin, and the apparatus has: pin connection detection means for detecting an editing request (editing request indicates an operation by a designer such as moving a component, adding a component, deleting a component, etc.) of requesting to disconnect a first signal line, which is connected to the first pin, from the first pin and connect to the second pin in the first substrate as the changed information; and design data editing means for editing design data of the multi-board so as to disconnect the first signal line from the first pin and connect to the second pin, and disconnect the second signal line, which is connected to the third pin, from the third pin and connect to the fourth pin in the second substrate in the case where the editing request is detected as the changed information by the pin connection detection means.

Further, the present invention is the above-described invention which has: terminal detection means, which is equipped with terminals including a plurality of displays connected by a network, and, when editing in an arbitrary substrate which constitutes the multi-board is performed in a predetermined terminal, for detecting a terminal other than the predetermined terminal displaying the substrate in which the editing was performed; and displayed contents changing means for changing displayed contents of the terminal other than the predetermined terminal, which is detected by the terminal detection means, based on the changed information, in which plurality of designers perform design of the multi-board in parallel by using each terminal.

Further, the present invention is the above-described invention which has connection relationship displaying means for displaying the electrical connection relationship between substrates which constitutes multi-board by using a layered structure.

Further, the present invention is the above-described invention which has: substrate region designating means for designating an arbitrary substrate which constitutes the multi-board or at least one arbitrary region on the arbitrary substrate by a designer; and substrate region control means for forbidding a designer other than a predetermined designer to edit in the substrate or the region in order to enable only the predetermined designer to edit the substrate or the region designated by the substrate region designating means.

Further, the present invention is the above-described invention which has: designer information displaying means for displaying the information of the predetermined designer when a designer selects the substrate or the region to which the substrate region control means forbade a designer other than the predetermined designer to perform editing.

Further, the present invention is the above-described invention which has: object editing detection means for detecting editing information that editing of an object in the arbitrary substrate is started by a predetermined designer in an arbitrary substrate of the multi-board; and object control means for forbidding a designer other than the predetermined designer to edit the object in order to enable only the predetermined designer to edit the object when the object editing detection means detects the editing information.

Further, the present invention is a multi-board design method in which design is performed by a multi-board design apparatus that designs a multi-board in which a plurality of substrates are electrically connected, the method has: a setting process in which a designer sets connection information indicating electrical connection relationship between substrates which constitutes the multi-board; a changed information detection process in which, when editing in an arbitrary substrate which constitutes the multi-board is performed, contents changed by the editing is detected as changed information; and a connection information changing process in which connection information set in the setting process is changed so as to maintain electrical connection relationship between substrates in the multi-board based on the changed information detected in the changed information detection process.

Further, a program by the present invention allows a computer to function as the multi-board design apparatus of the present invention.

Further, a computer-readable recording medium by the present invention records the program therein.

Effect of the Invention

Since the present invention is constituted as explained above, it exerts an excellent effect that connection relationship between substrates can be always maintained.

BRIEF DESCRIPTION OF THE DRAWINGS

FIG. 7(*a*) is an explanatory view showing inter-substrate associating information stored in a layered structure file provided for the constitution information storage section, and FIG. 7(*b*) is an explanatory view showing an example of a display state on a structure information display section of the display device based on the inter-substrate associating information shown in FIG. 7(*a*).

FIG. 10(a) is an explanatory view showing inter-substrate connection information corresponding to connection information, and FIG. 10(b) is an explanatory view showing a state where connection information corresponding to the inter-substrate connection information of FIG. 10(a) is displayed.

FIG. 15 is a flowchart showing a processing routine of connection information changing processing performed in the multi-board design apparatus by the present invention.

FIGS. 16(a) (b) (c) (d) (e) (f) (g) are explanatory views for explaining a specific example in the connection information changing processing, and FIG. 16 (a) is an explanatory view showing a state where the connection destination of a component "IC1" is changed from a pin "A1" to a pin "A3" of a connector "CN1-1", and FIG. 16(b) is an explanatory view showing a state where the pin "A1" of the connector "CN1-1" exists in the inter-substrate connection information, and FIG. 16(c) is an explanatory view showing a state where the pin "A1" of a connector "CN1-2" in the substrate B, which is connected to the pin "A1" of the connector "CN1-1", is acquired from layer connection information, and FIG. 16 (d) is an explanatory view showing a state where a component "IC11" connected to the pin "A1" of the connector "CN1-2" exists in the design data of the substrate B, and FIG. 16(e) is an explanatory view showing a state where the pin "A3" of the connector "CN1-1" exists in the inter-substrate connection information, and FIG. 16(f) is an explanatory view showing a state where the pin "A3" of the connector "CN1-2" in the substrate B, which is connected to the pin "A3" of the connector "CN1-1", is acquired from the inter-substrate connection information, and FIG. 16(g) is an explanatory view showing a state where the connection destination of the component "IC11" provided for the substrate B was changed from the pin "A1" to the pin "A3" of the connector "CN1-2".

FIG. 17 is an explanatory view showing a processing of reflecting changed information by each designer in performing parallel design by a plurality of designers on the terminals of other designers.

FIG. 24 (a) is an explanatory view showing a state where a design target in which the substrate A and the substrate B and the substrate C are connected by cables is displayed on the display screen, and FIG. 24 (b) is an explanatory view showing a state where a design target in which a lower package, an IC chip and an upper package are laminated on the substrate A in order is displayed on the display screen, and FIG. 24 (c) is an explanatory view showing a state where an 8-layer substrate is displayed on the display screen as a design target.

MODES FOR IMPLEMENTING THE INVENTION

Hereinafter, referring to the attached drawings, an embodiment example of the multi-board design apparatus, the multi-board design method, the program and the computer-readable recording medium according to the present invention will be explained in detail.

Figure 1:
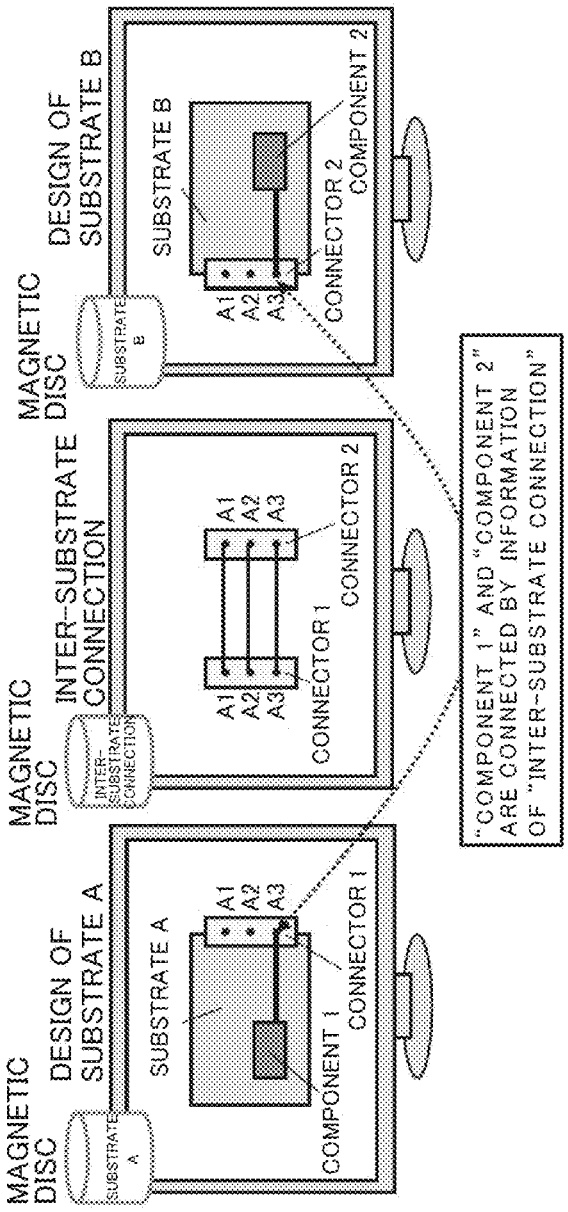
FIG. 1(*a*) is an explanatory view showing a state where a component 1 and a component 2 are designed so as to be electrically connected in the design of a plurality of substrates and inter-substrate connection connecting between the plurality of substrates, and FIG. 1(*b*) is an explanatory view showing a state where each design data of the substrate A, the substrate B and the inter-substrate connection is stored in a magnetic disc.
Figure 2:
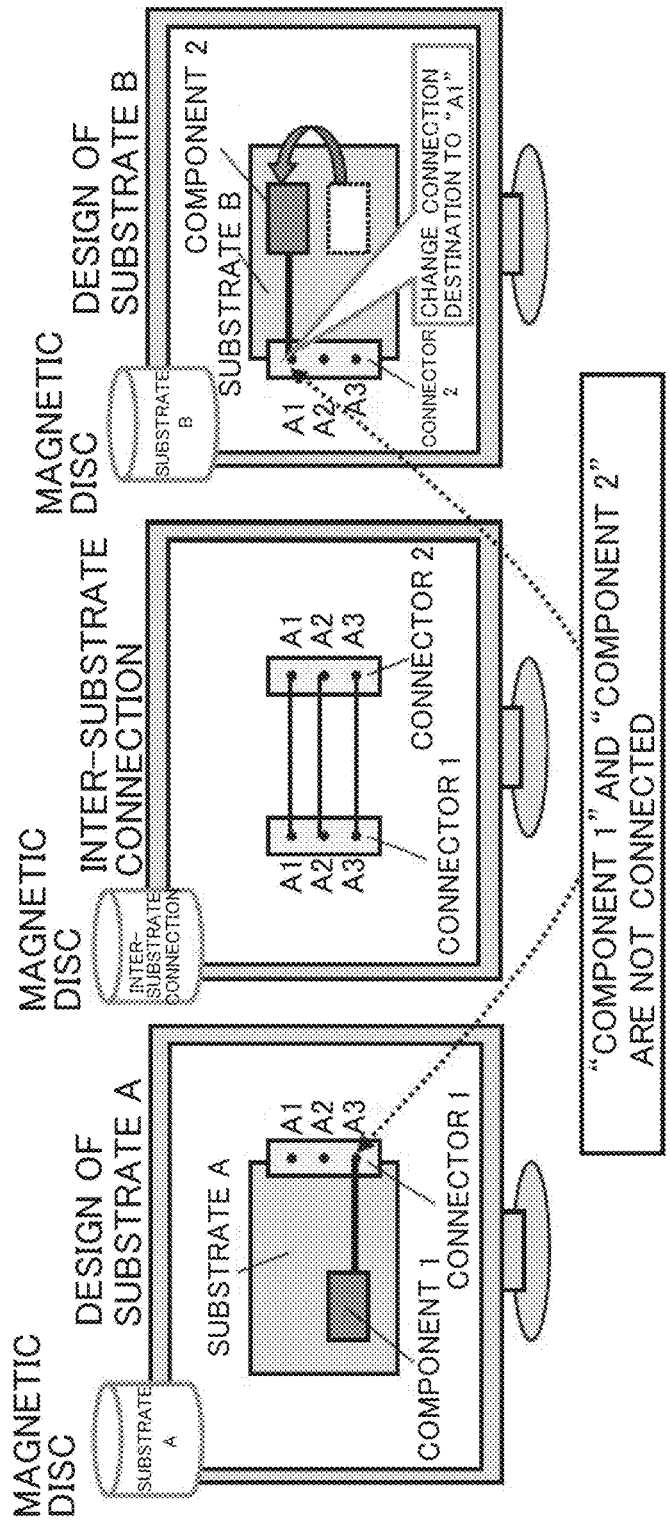
FIG. 2 is an explanatory view showing a state where an arrangement position and a connection destination of the component 2 of FIG. 1(*a*) were changed.
Figure 3:
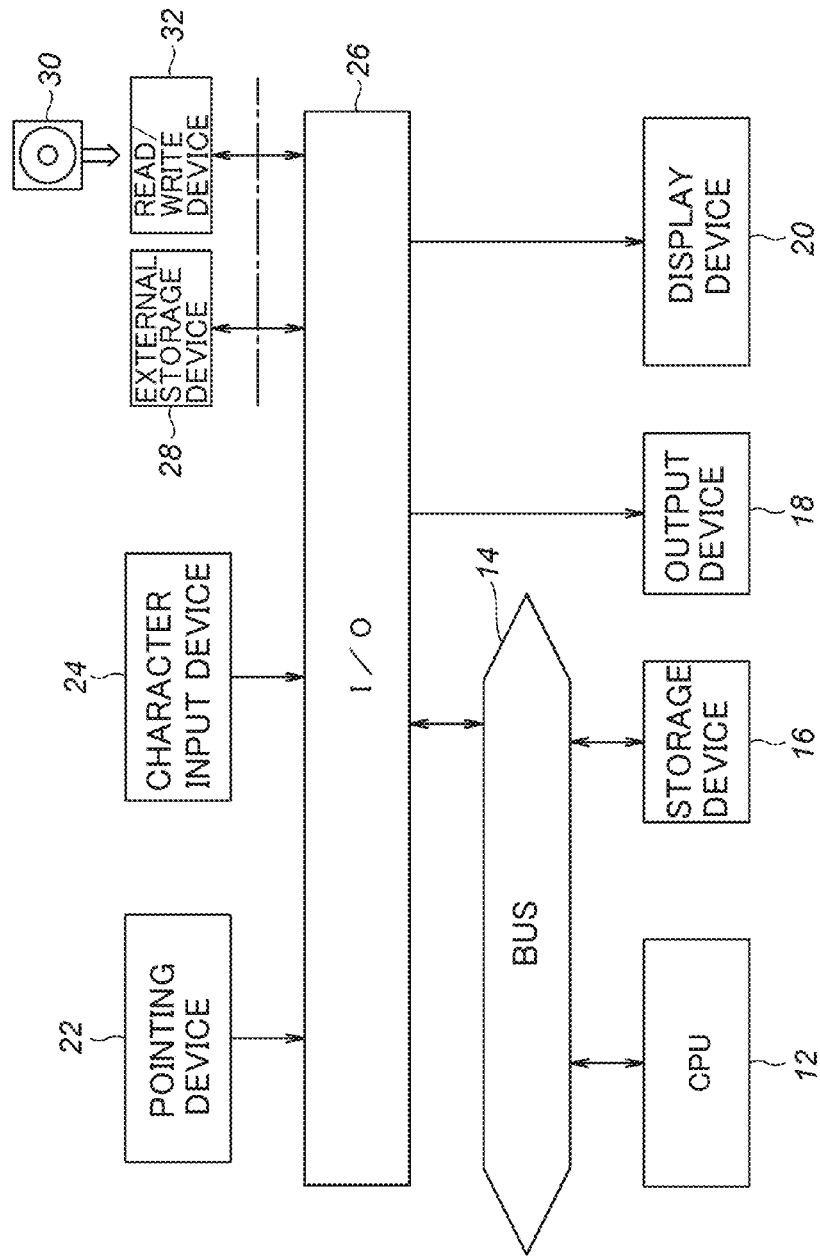
FIG. 3 is a block constitution explanatory view showing a hardware constitution of the multi-board design apparatus by the present invention.

Firstly, FIG. 3 shows the block constitution explanatory view showing a hardware constitution of the multi-board design apparatus by the present invention.

The multi-board design apparatus 10 by the present invention is realized by a publicly known personal computer, a general-purpose computer or the like, and the operation of the apparatus is controlled by using a central processing unit (CPU) 12.

Then, a storage device 16 which is constituted of a read only memory (ROM) storing a program for controlling the CPU, various kinds of data or the like, a random access memory (RAM) equipped with a storage region which is used as a working area for the CPU 12 or the like, and an input/output interface circuit (I/O) 26 for various instruments connected to the outside are connected to the CPU 12 via a bus 14.

Further, the multi-board design apparatus 10 is constituted by having an output device 18 such as a printer which outputs various data produced by the control of the CPU 12, a display device 20 equipped with a screen such as a CRT and a liquid crystal panel which performs various kinds of display based on the control of the CPU 12, a pointing device 22 such as a mouse being an input device for designating an arbitrary position on the display screen of the display device 20, and a character input device 24 such as a keyboard being an input device for inputting arbitrary characters.

Furthermore, in the multi-board design device 10, an external storage device 28 such as a hard disc is connected via the I/O 26, and a read/write device 32 for writing various data produced based on the control of the CPU 12 to a computer-readable recording medium (hereinafter, appropriately referred to as simply "recording medium") 30 such as a compact disc (CD) and a digital versatile disc (DVD) or for reading various data from the recording medium 30 to the storage device 16 are connected via the I/O 26.

Herein, a program for executing various kinds of processing by the multi-board design apparatus 10 (described later) and various data used in the various kinds of processing may be previously stored in the ROM or RAM of the storage device 16, or may be read from the external storage device 28 or the recording medium 30 to the RAM of the storage device 16.

Further, by providing a communication function for the multi-board design apparatus 10, a program for executing various kinds of processing by the multi-board design apparatus 10 (described later) and various data used in the various kinds of processing may be read from outside to the RAM of the storage device 16 of the multi-board design apparatus 10 through communication.

Now in the explanation below, to facilitate understanding of the multi-board design apparatus 10, other than the program for executing various kinds of processing by the multi-board design apparatus 10, various data used in the various kinds of processing should be previously stored in the storage device 16.

Figure 4:
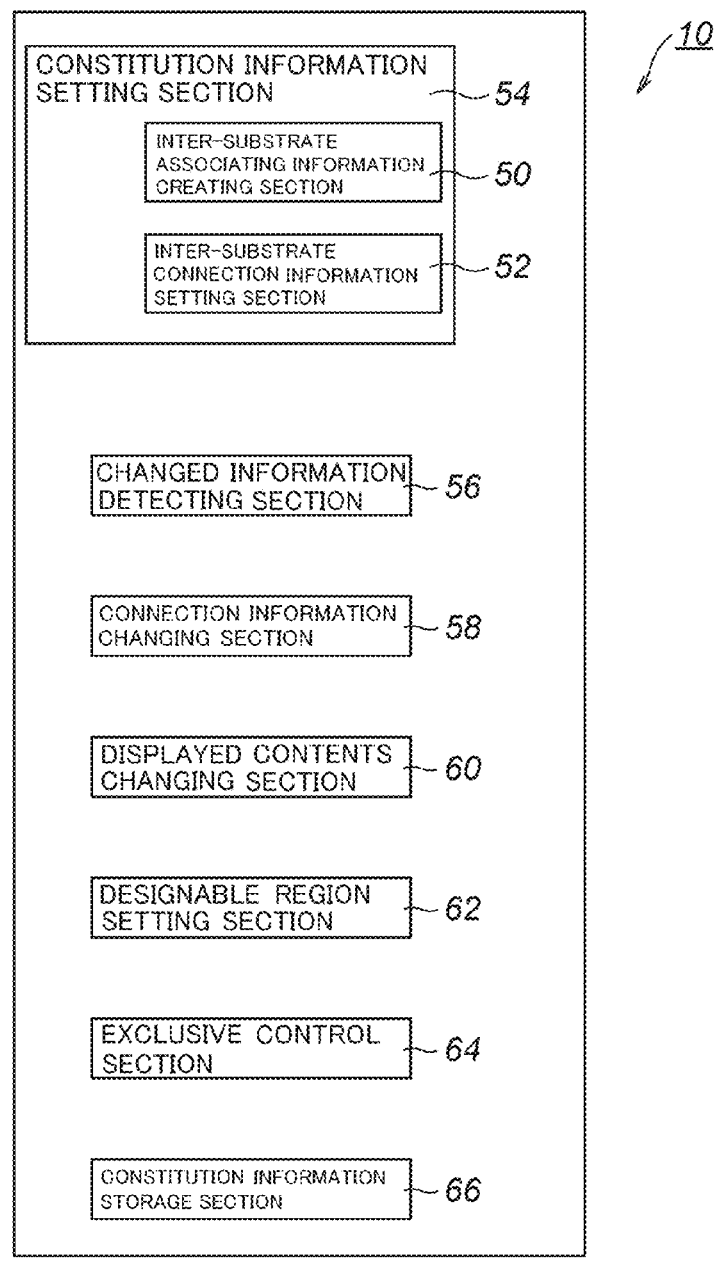
FIG. 4 is a block constitution explanatory view showing a functional constitution of the multi-board design apparatus by the present invention.

Next, referring to FIG. 4, the multi-board design apparatus 10 by the present invention will be explained in detail. FIG. 4 is a block constitution explanatory view showing the functional constitution of the multi-board design apparatus by the present invention.

The multi-board design apparatus 10 is constituted by having: a constitution information setting section 54 which consists of an inter-substrate associating information creating section 50 which creates, by using a layered structure, inter-substrate associating information indicating electrical connection relationship between substrates constituting a multi-board being a design target, and an inter-substrate connection information setting section 52 which sets inter-substrate connection information indicating electrical connection information between substrates in the layered structure created in the inter-substrate associating information creating section 50, and sets constitution information of the design target; a changed information detecting section 56 of the apparatus detects the changed information (hereinafter, referred to as changed information), as the constitution information set by the constitution information setting section 54 is changed by a designer; a connection information changing section 58 of the apparatus changes connection information between layers of the design target based on the changed information detected by the changed information detecting section 56 and the constitution information set in the constitution information setting section 54; a displayed contents changing section 60 of the apparatus creates three-dimensional shape data of the multi-board being a design target (hereinafter, "three-dimensional shape data" is also referred to as "model data") based on design data of substrates stored in the storage device 16, the inter-substrate associating information and the inter-substrate connection information and displays the inter-substrate associating information and the model data, and which changes the displayed contents displayed on the display device 20 based on changed contents changed by the connection information changing section 58; a designable region setting section 62 which sets a region designable only by a predetermined designer; an exclusive control section 64 which forbids operation by designers other than a predetermined designer who was set in the designable region setting section 62; and a constitution information storage section 66 of the apparatus stores the constitution information set in the constitution information setting section 54, and changes and stores the constitution information based on the changed information detected by the changed information detecting section 56.

Now in this embodiment, a multi-board made up of a plurality of electrically connected substrates should be described as a design target. Further, such a multi-board is design data of electronic substrates created by electronic substrate designing equipment such as CAD and CAM, and is already stored in the storage device 16 as described above.

More particularly, the inter-substrate associating information creating section 50 in the constitution information setting section 54 creates the inter-substrate associating information by using a predetermined constituent element constituting the design target as a unit, and the inter-substrate associating information is created for a multi-board made up of a plurality of substrates by using each substrate constituting the multi-board as a unit for example.

Further, the inter-substrate connection information setting section 52 in the constitution information setting section 54 sets electrical connection information between constituent elements of the layered structure in the inter-substrate associating information created by the inter-substrate associating information creating section 50, and electrical connection information between substrates which constitutes the multi-board is set to the multi-board made up of a plurality of substrates for example.

Furthermore, the changed information detecting section 56, as the inter-substrate associating information or the model data (described later) is changed by an operation of the designer, detects the changed inter-substrate associating information or changed information of the model data, the detected changed information is output to the constitution information storage section 66, and stored in the constitution information storage section 66.

Further, the changed information detecting section 56 makes the apparatus detect editing information indicating that editing of an object (described later) was started (ended) by an operation of the designer or setting information indicating that exclusive setting which forbids editing by a designer other than a predetermined designer was performed, and output and store the detected various information to the constitution information storage section 66.

The connection information changing section 58 makes the apparatus change the connection information based on the changed information which was detected by the changed information detecting section 56 and stored in the constitution information storage section 66 and the constitution information of the constitution information setting section 54.

Specifically, the connection information changing section 58 makes the apparatus change the constitution information related to the changed information such that electrical connection relationship in the constitution information set in the constitution information setting section 54 before the change is maintained.

Further, the displayed contents changing section 60 makes the apparatus change the displayed contents displayed on the display device 20 based on the changed contents changed by the connection information changing section 58.

Further, the displayed contents changing section 60 makes the apparatus perform processing of changing a display state so as to make design-changed area clear, which was performed by a designer other than a predetermined designer or displaying a predetermined mark or a message notifying the changed contents, or the like, for example, when a plurality of designers perform design works.

The displayed contents changing section 60 displays the inter-substrate associating information created by the inter-substrate associating information creating section 50 and the inter-substrate connection information created by the inter-substrate connection information setting section 52, and creates and displays the model data of the design target based on the design data of substrates, the inter-substrate associating information and the inter-substrate connection information stored in the storage device 16.

Furthermore, the displayed contents changing section 60, in the case where a designable region is set by the designable region setting section 62, in order to make a region to which design cannot be performed becomes clear for designers based on the setting contents, makes the apparatus display a region to which design cannot be performed by gray out or surrounds a region to which design cannot be performed by a predetermined line segment and displays a mark showing editing forbidden on the region, for example.

Further, the displayed contents changing section 60 detects the displayed contents displayed on the display screen of terminals used by each designer in performing design by a plurality of designers for example.

The designable region setting section 62 sets a region to which each designer can perform design in performing design by a plurality of designers, in which each designer sets a region to which design is performed on the design target by himself/herself or a predetermined designer sets a region to which each designer performs design.

Further, the exclusive control section 64, in performing design by a plurality of designers, performs exclusive control for forbidding an operation by other designers in a designable region for the designer set in the designable region setting section 62.

Furthermore, the exclusive control section 64, in performing design by a plurality of designers, performs exclusive control for forbidding an operation of a predetermined object (described later) by other designers while any designer operates the predetermined object, in a region which is not set in the designable region setting section 62 and to which all designers can perform design.

The constitution information storage section 66 previously stores design data of each substrate, and stores the constitution information set in the constitution information setting section 54. Furthermore, the storage section changes and stores the constitution information based on the changed information detecting by the changed information detecting section 56 in this apparatus, and stores the constitution information changed by the connection information changing section 58.

Now, such a constitution information storage section 66, in the case of performing parallel design by a plurality of designers, stores the changed information detected by the changed information detecting section 56 in this apparatus and outputs the information to terminals used by each designer. Further, the changed information detecting section 56 outputs the stored substrate data to terminals used by each designer as needed. The substrate data is data indicating each substrate in a design target made up of a plurality of substrates.

In the above-described constitution, the case of designing the multi-board 100 by the multi-board design apparatus 10 by the present invention, that is, the case of editing a plurality of substrates being constituent elements of the multi-board 100 will be explained.

Firstly, referring to FIG. 5 to FIG. 12, setting in the constitution information setting section 54 will be explained.

In the setting in the constitution information setting section 54, a layered structure is created by using each substrate, which is a constituent element of the multi-board 100 as a unit, to the multi-board 100 which is a target of design by the inter-substrate associating information creating section 50, and work of setting the connection information of the each substrate by the inter-substrate connection information setting section 52 is performed.

Firstly, creation of the layered structure to the multi-board 100 by the inter-substrate associating information creating section 50 will be explained.

Figure 5A:
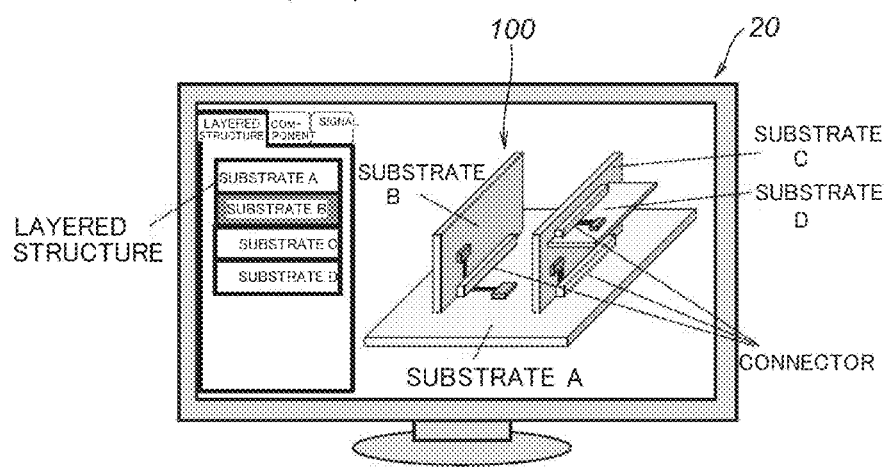
FIG. 5(*a*) is an explanatory view showing a display screen of a display device in setting constitution information of the multi-board design apparatus by the present invention, and FIG. 5(*b*) is an explanatory view showing a constitution information storage section in a state where constitution information of a multi-board being a design target shown in FIG. 5(*a*) is stored.
Figure 5B:
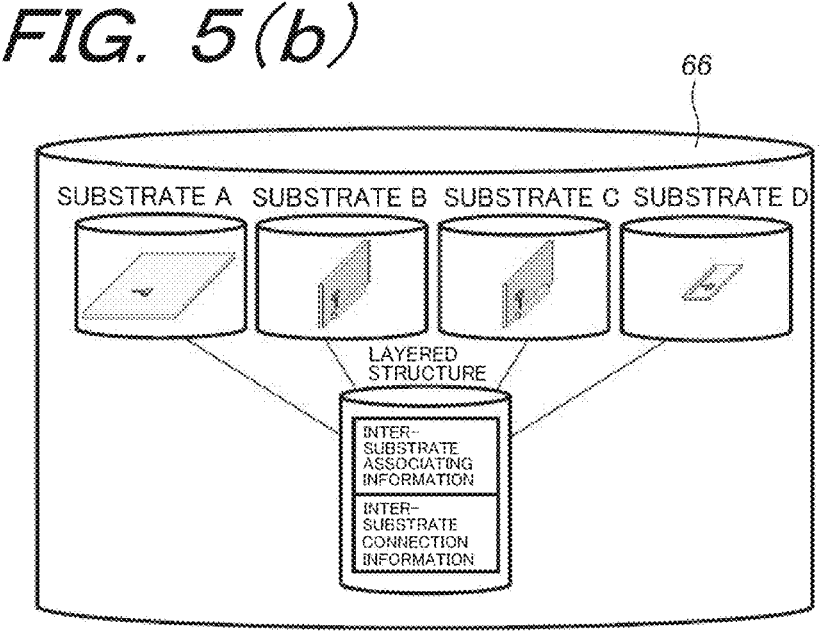
Figure 6A:
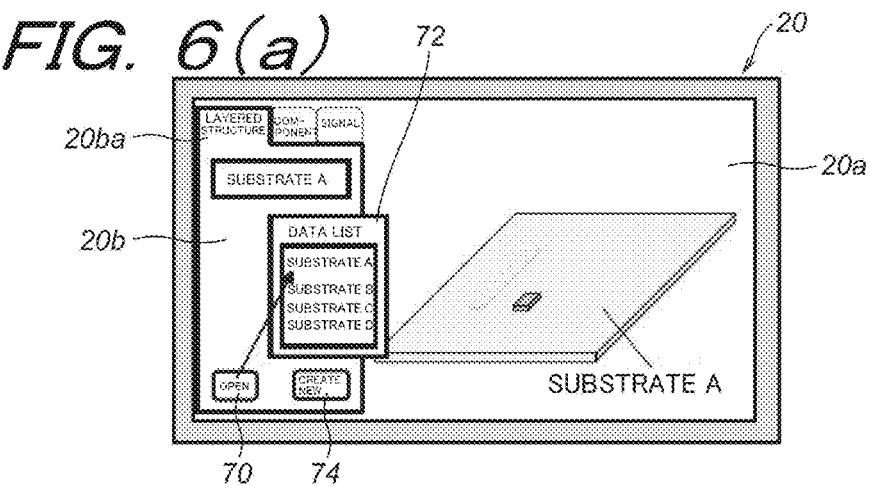
FIGS. 6(*a*) (*b*) (*c*) are explanatory views showing a procedure in constituting substrate data being constitution information of a substrate, which is stored in the constitution information storage section shown in FIG. 5(*b*), in a layer structure.
Figure 6B:
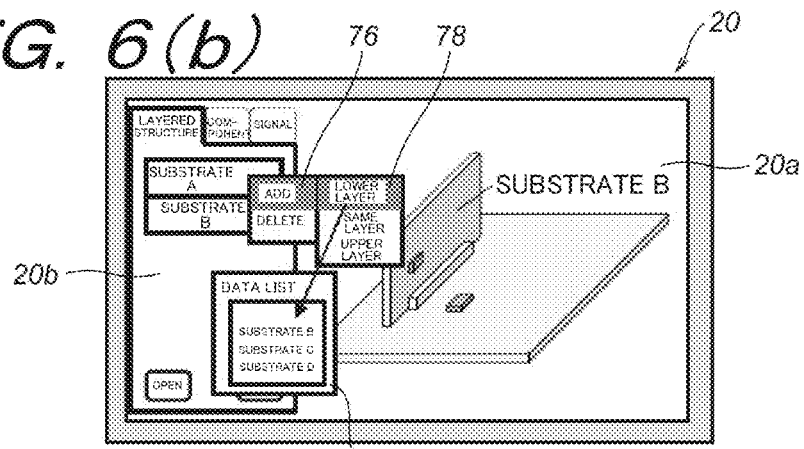

Herein, FIG. 5(*a*) shows an explanatory view indicating the display screen of the display device in setting constitution information of the multi-board design apparatus by the present invention, and FIG. 5(*b*) shows an explanatory view indicating a constitution information storage section in a state where the constitution information of the multi-board being a target of design shown in FIG. 5(*a*) is stored, and FIGS. 6(*a*) (*b*) (*c*) show explanatory views for explaining a procedure in constituting substrate data being the constitution information of a substrate stored in the constitution information storage section shown in FIG. 5(*b*) in the layered structure, and FIG. 7(*a*) shows an explanatory view indicating the inter-substrate associating information stored in layer information provided for the constitution information storage section, and FIG. 7(*b*) shows an explanatory view indicating an example of a display state in the structure information display section in the display device based on the inter-substrate associating information shown in FIG. 7 (*a*).

In the multi-board design apparatus 10, the designer performs design work on the display screen in the display device 20 as shown in FIG. 5 (*a*), and a model data display section 20*a* on which the multi-board 100 which is a target of design is displayed as three-dimensional shaped model data and a structure information display section 20*b* on which the structure information of the multi-board 100 is displayed are displayed on the screen of the display device 20. Specifically, the designer edits the substrate data by editing the contents displayed on the structure information display section 20*b* or the contents displayed on the model data display section 20*a*, and performs design of the multi-board.

In the explanation below, creation of the layered structure in the multi-board 100 shown in FIG. 6 (*a*) will be explained.

Regarding such a creation of the layered structure, processing is conducted in the inter-substrate associating information creating section 50, and as the designer selects the layered structure tab 20*ba* of the structure information display section 20*b* and clicks an open button 70 displayed on the structure information display section 20*b* first, a data list window 72 is opened. Then, "substrate A" is selected from the data list displayed in the data list window 72, and the substrate A is displayed on the structure information display section 20*b*, and the model data of the substrate A is displayed on the model data display section 20*a* (refer to FIG. 6(*a*)).

Now in the case of newly creating substrate data, a create new button 74 displayed on the structure information display section 20*b* is clicked to create new substrate data. Now, since publicly known technique can be used regarding creation of such new substrate data, its detailed description should be omitted.

Next, in the case of adding a substrate B to the layered structure, the substrate A displayed on the structure information display section 20*b* is selected to display an add/delete setting menu 76, and "add" is selected from the displayed add/delete setting menu 76. As "add" is selected in the add/ delete setting menu 76, a layer setting menu 78 is displayed, "lower layer level" is selected from the displayed layer setting menu 78, "the substrate B" is selected from a data list displayed in a data list window 80 which was opened in selecting "lower layer level" from the layer setting menu 78. Thus, the substrate B is added in the structure information display section 20b as the data on a lower order layer of the substrate A, and the model data of the substrate B is displayed on the substrate A in the model data display section 20a (refer to FIG. 6(b)).

Figure 6C:
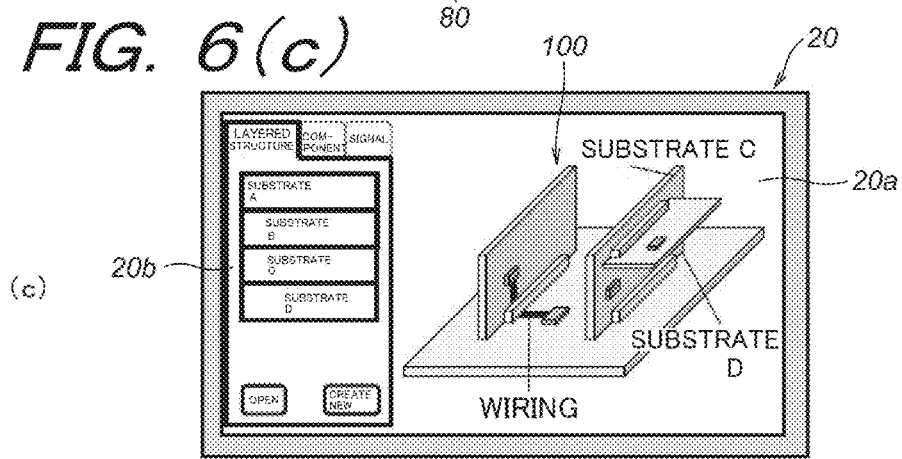

Similarly, regarding the substrate C and a substrate D as well, "add" is selected in the add/delete setting menu 76, the substrate C and the substrate D is add to the layered structure on the display screen of the display device 20, and the model data of the substrate C and the substrate D are displayed (refer to FIG. 6(c)).

Specifically, in the case of adding the substrate C to the layered structure, the substrate B displayed in the structure information display section 20b is selected to display the add/delete setting menu 76, and "add" is selected from the displayed add/delete setting menu 76. As "add" is set in the add/delete setting menu 76, the layer setting menu 78 is displayed, "same layer" is selected from the displayed layer setting menu 78, and "substrate C" is selected from a data list displayed in a data list window 80 which was opened when "same layer" was selected from the layer setting menu 78. Thus, the substrate C is added in the structure information display section 20b as the data on the same order layer of the substrate B and the model data of the substrate C is displayed on the substrate A in the model data display section 20a.

Now, in the case of adding the substrate C to the layered structure, the substrate A displayed on the structure information display section 20b is selected, "add" is selected from the add/delete setting menu 76, "lower layer" is selected from the layer setting menu 78, "substrate C" is selected from the data list of the data list window 80, by which the substrate C is added in the structure information display section 20b as the data on the same order layer of the substrate B on a lower order layer of the substrate A, and the model data of the substrate C may be displayed on the substrate A in the model data display section 20a.

Further, in the case of adding the substrate D to the layered structure, the substrate C displayed on the structure information display section 20b is selected to display the add/delete setting menu 76, and "add" is selected from the displayed add/delete setting menu 76. As "add" is set in the add/delete setting menu 76, the layer setting menu 78 is displayed, "lower layer" is selected from the displayed layer setting menu 78, and "substrate D" is selected from the data list displayed in the data list window 80 which was opened when "lower layer" was selected from the layer setting menu 78. Thus, the substrate D is added in the structure information display section 20b as the data on a lower order layer of the substrate C, and the model data of the substrate D is displayed on the substrate C in the model data display section 20a.

As the layered structure of the multi-board 100 is created in this manner, the created layered structure is stored as the inter-substrate associating information in the layer information of the constitution information storage section 66 in which design data of each substrate (i.e., substrate data of each substrate) is severally stored in a separate file (refer to FIG. 5(b)). Now, as design data of substrate stored in each file in the constitution information storage section 66, the model data of a substrate (i.e., three-dimensional shape data of substrate), the model data of a component (i.e., three-dimensional shape data of component), arrangement information, and electrical connection information or the like of components are stored.

As the inter-substrate associating information, the information is stored by adding IDs or parent IDs as shown in FIG. 7(a) for example so as to correspond to the displayed layered structure shown in the structure information display section 20b of the display screen of the display device 20, which is shown in FIG. 7(b).

In other words, the information is stored such that an ID is added to each substrate and the ID of a substrate positioned at a parent layer (upper order layer) is added as a parent ID to a substrate at a lower order layer.

Specifically, regarding the substrate A, "1" is added as an ID but a parent ID is not added, and regarding the substrate B, "2" is added as an ID and "1" being the ID of the substrate A is added as a parent ID. Further, regarding the substrate C, "3" is added as an ID and "1" being the ID of the substrate A is added as a parent ID, and regarding the substrate D, "4" is added as an ID and "3" being the ID of the substrate C is added as a parent ID.

Next, setting of connection relationship between substrates, which constitutes the multi-board 100, by the inter-substrate connection information setting section 52 will be explained.

Figure 8A:
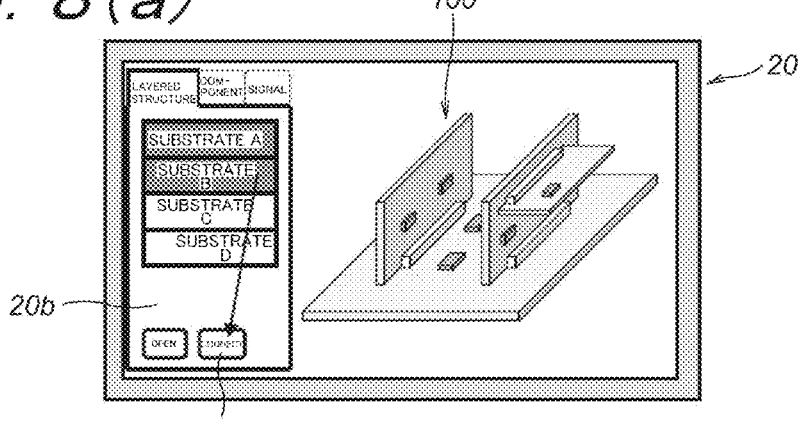
FIGS. 8(*a*) (*b*) (*c*) are explanatory views showing procedures in setting connection relationship between layers in a multi-board in which a layered structure is created.
Figure 9A:
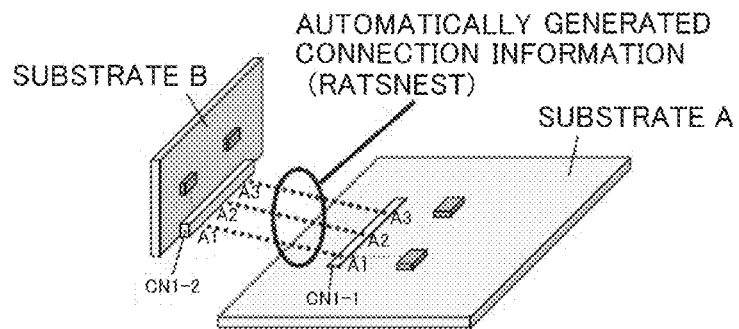
FIG. 9(*a*) is an explanatory view showing a state where connection information that the substrate A and the substrate B are electrically connected is automatically generated, and FIG. 9(*b*) is an explanatory view showing a state having no connection information in FIG. 9(a), and FIG. 9 (c) is an explanatory view showing a state having connection information in FIG. 9(a).
Figure 9B:
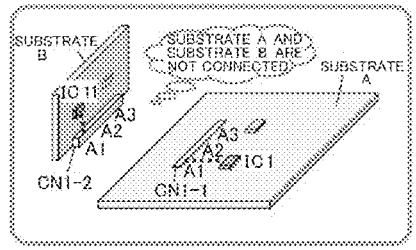
Figure 9C:
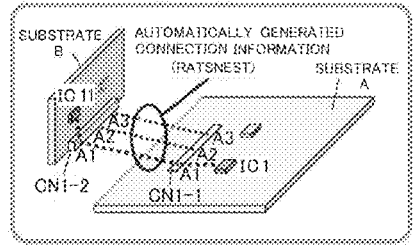

Herein, FIGS. 8(a) (b) (c) show explanatory views for explaining a procedure in setting connection relationship between layers in the multi-board in which a layered structure is created, and FIG. 9(a) shows an explanatory view indicating a state where connection information that the substrate A and the substrate B are electrically connected is automatically generated, and FIG. 9(b) shows an explanatory view indicating a state having no connection information, and FIG. 9(c) shows an explanatory view indicating a state having connection information, and FIG. 10(a) shows an explanatory view indicating inter-substrate connection information corresponding to connection information, and FIG. 10(b) shows an explanatory view indicating a state where connection information corresponding to the inter-substrate connection information of FIG. 10(a) is displayed.

In the multi-board 100 in which the layered structure was created, electrical connection relationship between substrates being a constituent element of the multi-board 100 is set. Firstly, two substrates to which electrical connection relationship is set are selected. Now, in the explanation below, a case of setting electrical connection relationship between the substrate A and the substrate B will be explained.

As "substrate A" and "substrate B" are selected from the list of the layered structure displayed on the structure information display section 20b, a connect button 82 is displayed on the structure information display section 20b, and the connect button 82 is clicked (refer to FIG. 8(a)).

Figure 8B:
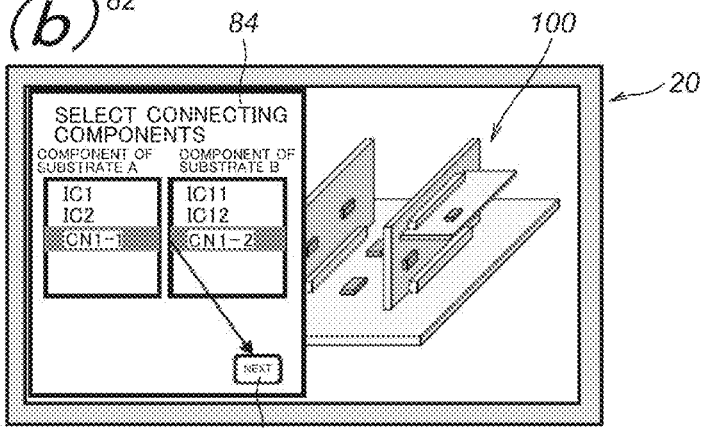

Then, a connecting component selection window 84 is displayed, lists of components arranged for each substrate of the substrate A and the substrate B are displayed in the connecting component selection window 84, by which components the substrate A and the substrate B are connected are selected, and a next button 86 displayed in the connecting component selection window 84 is clicked (refer to FIG. 8(b)).

Specifically, as shown in FIG. 8(b), lists of components arranged for the substrate A and the substrate B are displayed in the connecting component selection window 84, "IC1", "IC2" and "CN1-1" are displayed as "components of substrate A", and "IC11", "IC12" and "CN1-2" are displayed as "components of substrate B". Then, out of the displayed components, components which electrically connect the substrate A and the substrate B are selected, "CN1-1" being a connector is selected from "component of substrate A", and "CN1-2" being a connector is selected from "components of substrate B".

Figure 8C:
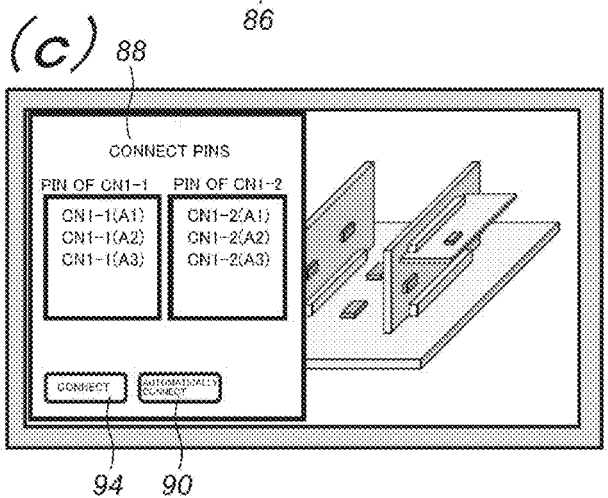

As the components are severally selected in the substrate A and the substrate B in this manner, a connecting pin selection window 88 in the components is displayed, lists of pins provided for each connector of CN1-1 and CN1-2 are displayed in the connecting pin selection window 88, by which pins CN1-1 and CN1-2 are connected are selected, and an automatically connect button 90 displayed in the connecting pin selection window 88 is clicked (refer to FIG. 8(*c*)).

Specifically, as shown in FIG. 8 (*c*), lists of pins provided for CN1-1 and CN1-2 are displayed in the connecting pin selection window 88, "CN1-1 (A1)", "CN1-1 (A2)" and "CN1-1 (A3)" are displayed as "pins of CN1-1", and "CN1-2 (A1)", "CN1-2 (A2)" and "CN1-2 (A3)" are displayed as "pins of CN1-2".

Then, as the automatically connect button 90 is clicked in the state where the pin lists of the connector "CN1-1" and the connector "CN1-2" are displayed, connection information indicating that pins having the same pin names (portions described in A1, A2, A3) should be electrically connected is automatically generated (refer to FIG. 9 (*a*)).

Now, in the case of connecting between pins having different pin names, by selecting pin names displayed in the pin lists in the connector "CN1-1" and the connector "CN1-2" and by clicking a connection button 94 after that, connection information occurs between designated pins.

A case where such connection information does not occur causes the state as shown in FIG. 9 (*b*).

Specifically, as shown in FIG. 9 (*b*), in the case where connection information does not occur, the component "IC1" provided on the substrate A is connected to the pin "A1" of the connector "CN1-1" and the component "IC11" provided on the substrate B is connected to the pin "A1" of the connector "CN1-2", but the component "IC1" and the component "IC11" are not in a connected state. For this reason, the substrate A and the substrate B are not in an electrically connected state.

On the other hand, in the case where the connection information occurred as shown in FIG. 9(*c*), the pin "A1" of the connector "CN1-1" and pin "A2" of the connector "CN1-2" are connected by the connection information, so that the component "IC1" and the component "IC11" make a connected state. For this reason, the substrate A and the substrate B are in an electrically connected state.

After setting electrical connection relationship between the substrate A and the substrate B in this manner, electrical connection relationship between the substrate A and the substrate C is set in the same manner, and electrical connection relationship between the substrate C and the substrate D is set.

Then, as electrical connection relationship between substrates is set, the set connection relationship is stored in layer information of the constitution information storage section as the inter-substrate connection information (refer to FIG. 5(*b*)).

As the inter-substrate connection information, connection relationship as shown in FIG. 10(*a*) is stored by this apparatus for example, as shown in FIG. 10.

Specifically, the substrate information of the upper order layer is stored as parent information, and the substrate information of the lower order layer is stored as sub information.

Specifically, in the case where "parent design data", "parent component" and "parent pin" are stored as parent information, "sub design data", "sub component" and "sub pin" are stored as sub information, and a pin A1 of the connector CN1-1 arranged for the substrate A and a pin A1 of the connector CN1-2 arranged for the substrate B are electrically connected, "substrate A" as parent design data, "CN1-1" as a parent component, "A1" as a parent pin are stored, and "substrate B" as sub design data, "CN1-2" as a sub component, and "A1" as a sub pin are stored as shown in line 1 of FIG. 10 (*a*).

Similarly, in the case where a pin A2 of the connector CN1-1 arranged for the substrate A and a pin A2 of the connector CN1-2 arranged for the substrate B are electrically connected, "substrate A" as parent design data, "CN1-1" as a parent component, "A2" as a parent pin are stored, "substrate B" as sub design data, "CN1-2" as a sub component, "A2" as a sub pin are stored as shown in line 2 of FIG. 10 (*a*), and in the case where the pin A3 of the connector CN1-1 arranged for the substrate A and the pin A3 of the connector CN1-2 arranged for the substrate B are electrically connected, "substrate A" as parent design data, "CN1-1" as a parent component, "A3" as a parent pin are stored, and "substrate B" as sub design data, "CN1-2" as a sub component, "A3" as a sub pin are stored as shown in line 3 of FIG. 10 (*a*).

Regarding the multi-board 100 being a design target in which the constitution information was created in this manner, a case of performing design in parallel by a plurality of designers will be explained next.

Now, in the case of parallelly designing the multi-board 100 being a design target by a plurality of designers utilizing the multi-board design apparatus 10, terminals used by each designer are connected by a network.

Specifically, referring to FIG. 12 to FIG. 16, the case where the designer A performs design of the substrate A and the designer B performs design of the substrate B in the multi-board 100 will be explained. Now, in and after FIG. 12, to facilitate understanding of explanation, display on the display screen of the display device 20 is displayed using the model data display section 20*a* as a center. Further, the overview of the multi-board 100 is displayed on the upper left of the display screen, and the layered structure of a substrate is displayed on the lower left as needed, and a substrate being designed is displayed in highlight in the constitution structure.

Figure 12:
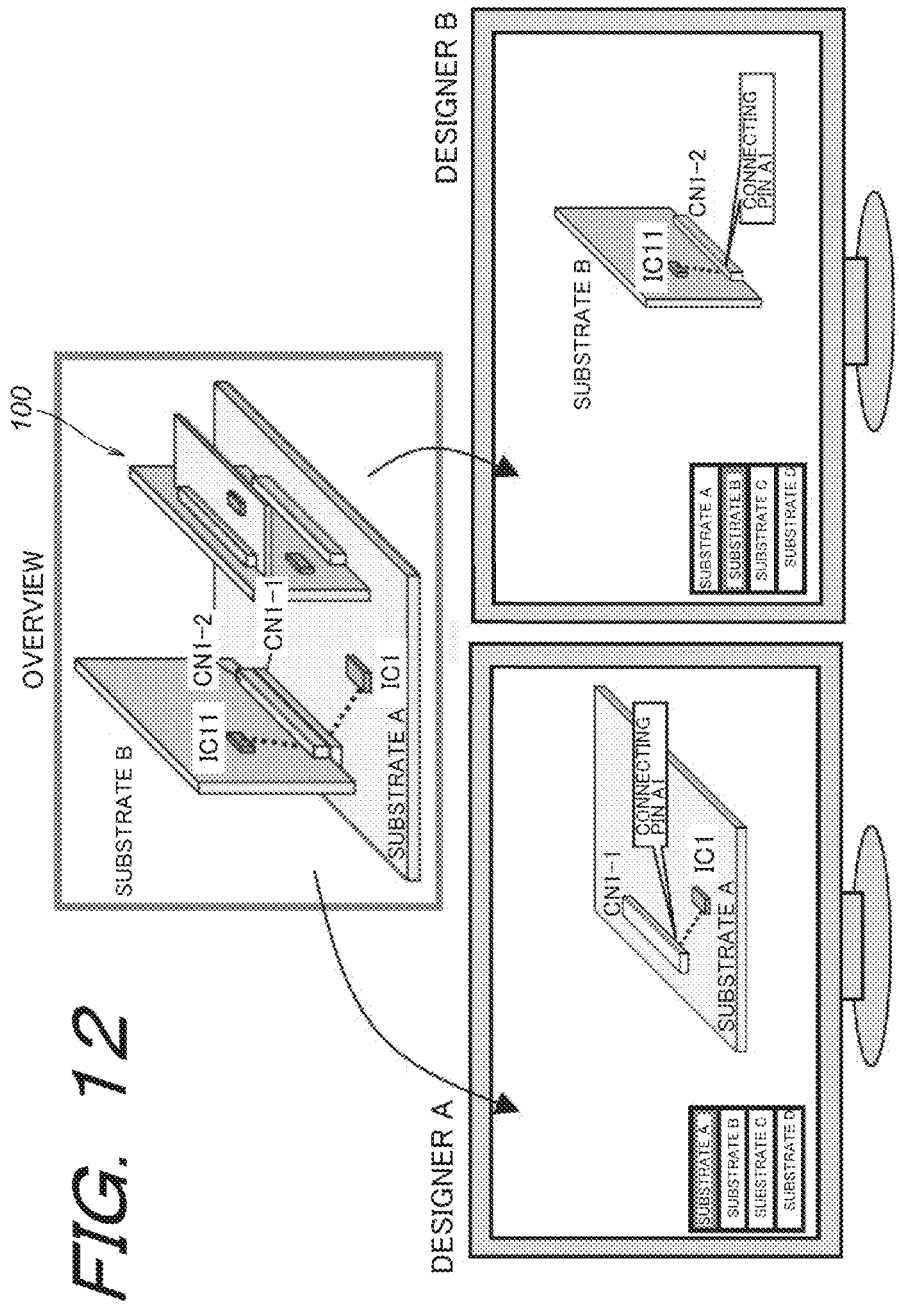
FIG. 12 is an explanatory view showing substrate data displayed on the terminal of a designer A and substrate data displayed on the terminal of a designer B.
Figure 13:
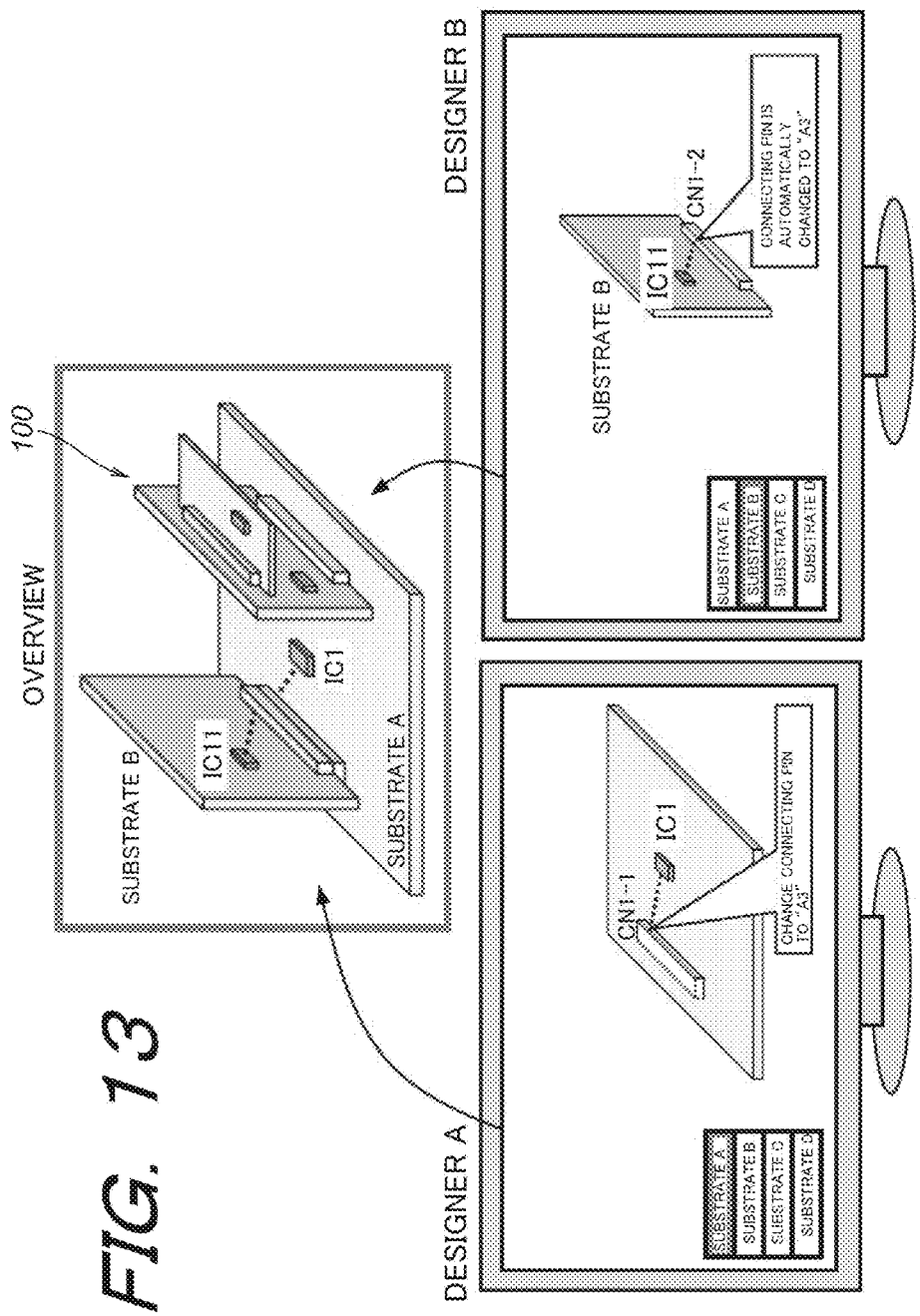
FIG. 13 is an explanatory view showing a state where substrate data displayed on the terminal of the designer B is changed by the movement of a component by the designer A.

On the display screen of the display device 20 of the designer A, the substrate A is displayed in highlight in the layered structure on the lower left, and on the display screen of the display device 20 of the designer B, the substrate B is displayed in highlight in the layered structure on the lower left (refer to FIG. 12).

Now, in the multi-board 100, connection relationship between substrates is set by the constitution information setting section 54, and the component "IC1" of the substrate A and the component "IC11" of the substrate B are set so as to be connected by electrical connection information via the connector "CN1-1" and the connector "CN1-2". Further, setting is made such that the component "IC1" is connected to the pin "A1" of the connector "CN1-1" and the component "IC11" is connected to the pin "A1" of the connector "CN1-2".

After that, as the designer A moves the component "IC1" on the substrate A, and changes the connection destination of the component "IC1" from the pin "A1" to the pin "A3" of the connector "CN1-1", connection information of the substrate B edited by the designer B is automatically changed by the processing in the changed information detecting section 56, the connection information changing section 58 and the displayed contents changing section 60. In short, in the substrate B, the connection destination of the component "IC11" is automatically changed from the pin "A1" to the pin "A3" of the connector "CN1-2" (refer to FIG. 13).

By automatically changing the connection information of the other substrate with the change of connection information in one substrate in this manner, it becomes possible to design each substrate data in parallel in the state where electrical connection relationship between substrates being a constituent element of the multi-board 100 is maintained.

Figure 14A:
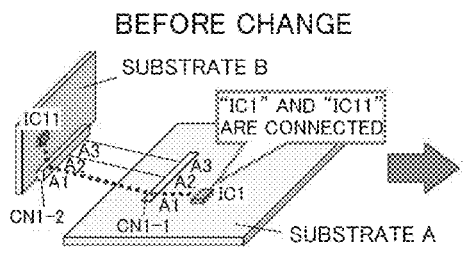
FIGS. 14(a) (b) are explanatory views showing a state where automatic change of connection information was not performed in the substrate B by the movement of a component by the designer A, and FIGS. 14(c) (d) are explanatory views showing a state where automatic change of connection information was performed in the substrate B by the movement of a component by the designer A.
Figure 14B:
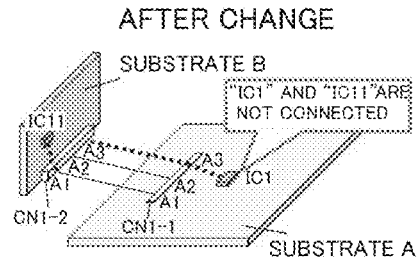
Figure 14C:
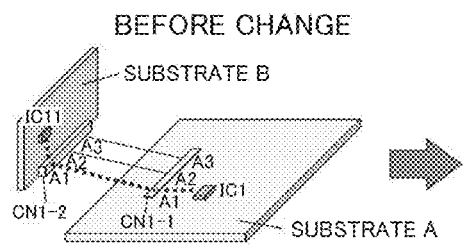
Figure 14D:
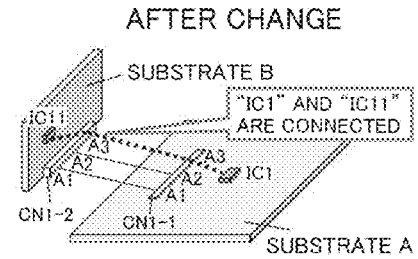

Herein, in the case where there is no constitution of automatically changing the connection information of the other substrate with such a change of connection information in one substrate, the component "IC1" provided for the substrate A and the component "IC11" provided for the substrate B are not in a connected state as shown in FIG. 14(b).

Specifically, in the case where the connection information of the other substrate is not automatically changed with the change of connection information in one substrate, the component "IC1" and the component "IC11" are in a connected state via the pin "A1" of the connector "CN1-1" and the pin "A1" of the connector "CN1-2" as shown in FIG. 14(a) before the change of the connection destination of the component "IC1" by the designer A. On the other hand, after the connection destination of the component "IC1" was changed from the pin "A1" to the pin "A3" of the connector "CN1-1" by the designer A, pin connection in the component "IC11" and the connector "CN1-2" is not changed so that the component "IC1" and the component "IC11" are not in a connected state as shown in FIG. 14(b). For this reason, the substrate A and the substrate B are not in a connected state in this case.

On the other hand, the multi-board design apparatus 10 is equipped with a constitution in which the connection information of the other substrate is automatically changed with the change of the connection information in one substrate, by which a connected state of each substrate (connected state of each component) can be maintained, and parallel design of each substrate data by a plurality of designers is enabled.

Specifically, in the multi-board design apparatus 10, as the designer A changes the connection destination of the component "IC1" from the pin "A1" to the pin "A3" of the connector "CN1-1" from the state where the component "IC1" and the component "IC11" are connected via the pin "A1" of the connector "CN1-1" and the pin "A1" of the connector "CN1-2" (refer to FIG. 14 (c)) as described above, the connection destination of the component "IC11" is automatically changed from the pin "A1" to the pin "A3" of the connector "CN1-2" (refer to FIG. 14 (d)). For this reason, parallel design of each substrate data by a plurality of designers is enabled while the connected state of the component "IC1" and the component "IC11" is maintained.

Next, processing of automatically changing the connection information of the other substrate with the change of connection information in one substrate will be explained.

Assuming that, in a multi-board made up of a plurality of substrates, components are arranged for a predetermined substrate and a predetermined component having connection relationship with a component arranged for a substrate other than the predetermined substrate is moved by a designer, destination of the predetermined component is checked first and whether or not the destination of the predetermined component is the predetermined substrate is judged.

Then, as it is judged that the destination of a predetermined component is not the predetermined substrate, the predetermined component and a component having connection relationship with the component are brought into a directly connected state by electrical connection information.

Specifically, in the multi-board as shown in FIG. 12, as the component "IC1" arranged for the substrate A is moved to the substrate B by the designer, electrical connection information is generated in the component "IC11", which had connection relationship with the component "IC1" via the connectors CN1-1, CN1-2 in the substrate B, and the component "IC1" which was moved to the substrate B, and the component "IC1" and the component "IC11" are brought into a directly connected state. It is to be noted that the electrical connection information between the component "IC1" and the connector "CN1-1" and the electrical connection information between the component "IC11" and the connector "CN1-2" are deleted by this apparatus.

Further, as the component "IC1" arranged for the substrate A is move to the substrate C or the substrate D by the designer, electrical connection information is generated in the component "IC11", which had connection relationship with the component "IC1" via the connectors CN1-1 and CN1-2 in the substrate B, and the component "IC1" which moved to the substrate C or the substrate D, and the component "IC1" and the component "IC11" are brought into a directly connected state.

On the other hand, as it is judged that the destination of the predetermined component is within the predetermined substrate and the connection destination of the predetermined component was changed by the designer, the connection information changing processing is started, and connection information of substrates is automatically changed so as to maintain electrical connection relationship.

Specifically, as the connection destination of a predetermined component arranged for a predetermined substrate is changed, a connection destination of a component arranged for a substrate other than the predetermined substrate, which is connected with the predetermined component, is automatically changed. For example, as the connection destination of the component "IC1" is changed from the pin "A1" to a pin "A3" of the connector "CN1-1", the connection destination of the component "IC11" is automatically changed from the pin "A1" to the pin "A3" of the connector "CN1-2".

As a connection destination of a component to a pin of a connector or the like is changed in this manner, the connection information changing processing is started, which causes the connection information in a substrate other than the predetermined substrate to be automatically changed.

Specifically, in the multi-board as shown in FIG. 12, as the connection destination of the component "IC1" arranged for the substrate A is changed by the designer, the connection information changing processing is started.

Now, in the explanation below, processing contents of the connection information changing processing will be explained using the flowchart of FIG. 15, and the connection information changing processing when the designer A changed the connection destination of the component "IC1" provided for the substrate A from the pin "A1" to the pin "A3" of the connector "CN1-1" will be explained as a specific example (refer to FIG. 16).

Herein, the flowchart of FIG. 15 shows detail processing contents of the connection information changing processing, and in the connection information changing processing first, as connection of a component in one substrate, which is connected with the other substrate (connector for example), to a pin is changed by the designer, the changed information detecting section 56 detects the changed information (step S1502).

Figures 16A, 16B, 16C, 16D, 16E, 16F, 16G:
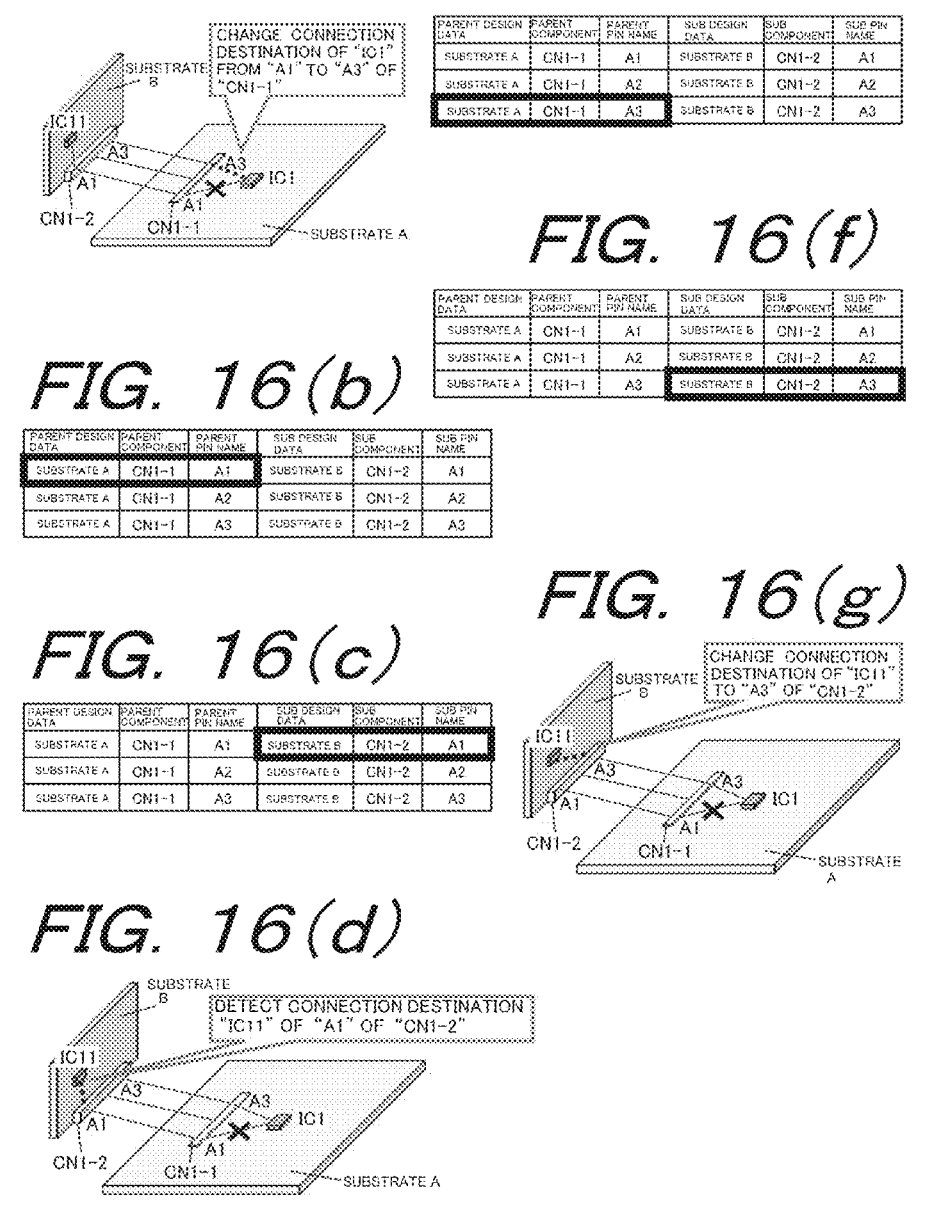

Specifically, as the designer A changes the connection destination of the component "IC1" on the substrate A from the pin "A1" to the pin "A3" of the connector "CN1-1", the changed information detecting section 56 detects information that the connection destination of the component "IC1" was changed from the pin "A1" to the pin "A3" of the connector "CN1-1" (refer to FIG. 16(a)).

From the information detected in the processing of step S1502 and the constitution information which was set in the constitution information setting section 54 and stored in the constitution information storage section 66, a pin of a connection destination before change (hereinafter, referred to as a pin before change) and a pin of a connection destination after change (hereinafter, referred to as a "a pin after change") are acquired (step S1504).

Specifically, the pin "A1" of the connector "CN1-1", which is the connection destination of the component "IC1" before change, is acquired from the information detected in the processing of step S1502, and the pin "A3" of the connector "CN1-1" which is the connection destination of the component "IC1" after change, is acquired from the constitution information stored in the constitution information storage section 66.

Then, judgment whether or not the acquired pin before change exists in the inter-substrate connection information, which was set in the inter-substrate connection information setting section in the constitution information setting section 54, is performed (step S1506).

Specifically, judgment whether or not the information of the pin "A1" of the connector "CN1-1", which is the connection destination before the designer A changes the connection destination of the component "IC1", exists in the inter-substrate connection information is performed.

In the judgment processing of the step S1506, as it is judged that a pin before change does not exist in the inter-substrate connection information, the connection information changing processing is ended without changing the connection information.

Further, in the judgment processing of step S1506, as it is judged that a pin before change exists in the inter-substrate connection information, a pin in the other substrate (hereinafter, referred to as "pin 1") which is connected with the pin before change is acquired from the inter-substrate connection information (step S1508) in the connection information changing section 58, and judgment whether or not a component connected to the pin 1 exists in the design data of the other substrate, which is stored in the constitution information storage section 66, is performed (step S1510).

Specifically, in the judgment processing of step S1506, judgment whether or not the pin "A1" of the connector "CN1-1" exists in the inter-substrate connection information as shown in FIG. 16(b) is performed.

Further, in the processing of step S1508, the pin "A1" of the connector "CN1-2" in the substrate B, which is connected with the pin "A1" of the connector "CN1-1", is acquired from the inter-substrate connection information (refer to FIG. 16(c)).

Then, in the judgment processing of step S1510, judgment whether or not a component which is connected with the pin "A1" of the connector "CN1-2", which was acquired in the processing of step S1508 exists, is performed.

In the judgment processing of the step S1510, as it is judged that a component connected to the pin 1 does not exist in the design data of the other substrate, the connection information changing processing is ended without changing the connection information.

On the other hand, in the judgment processing of step S1510, as it is judged that a component connected to the pin 1 exists in the design data of the other substrate, the component is acquired (step S1512), and then, judgment whether or not a pin after change exists in the inter-substrate connection information is performed (step S1514).

Specifically, in the judgment processing of step S1510, as it is judged that the a component "IC11" connected with the pin "A1" of the connector "CN1-2" exists in the design data of the substrate B (refer to FIG. 16(d)), the component "IC11" is stored in the processing of step S1512.

After that, in the processing of step S1514, judgment whether or not the information of the pin "A3" of the connector "CN1-1" exists in the inter-substrate connection information is performed.

In the judgment processing of step S1514, as it is judged that a pin after change does not exist in the inter-substrate connection information, the connection information changing processing is ended without changing the connection information.

Further, in the judgment processing of step S1514, as it is judged that a pin after change exists in the inter-substrate connection information, a pin in the other substrate which is connected with the pin after change (hereinafter, referred to as "pin 2") is acquired from the inter-substrate connection information in the connection information changing section 58, (step S1516), and a connection destination of the component acquired in the processing of step S1512 is changed from the pin 1 to the pin 2 (step S1518).

Specifically, in the judgment processing of step S1514, judgment whether or not the information of the pin "A3" of the connector "CN1-1" exists in the inter-substrate connection information is performed as shown in FIG. 16(e).

Further, in the processing of step S1516, the pin "A3" of the connector "CN1-2" in the substrate B, which is connected with the pin "A3" of the connector "CN1-1", is acquired from the inter-substrate connection information (refer to FIG. 16(f)).

Then, in the processing of step S1518, the connection destination of the component "IC11" provided for the substrate B is changed from the pin "A1" to the pin "A3" of the connector "CN1-2".

The information in which the connection information was changed in the processing of step S1516 in this manner is output from the connection information changing section 58 to be stored into the constitution information storage section 66, and is also output from a connection information changing section 58 to the displayed contents changing section 60, and displayed contents displayed on the display device 20 of the display screen is changed based on the contents of the information (step S1520).

Specifically, in the model data display section 20a, the connection destination of the component "IC11" provided for the substrate B is changed from the pin "A1" to the pin "A3" of the connector "CN1-2" (refer to FIG. 16(g)).

After that, the connection information changing processing is ended after display on the display screen of the display device 20 is changed.

Now, regarding such connection information changing processing, processing may be started in the case where the designer conducted some kind of editing by moving a model data or the like. In this case, a judgment processing whether or not a pin before change and a pin after change could be acquired is provided between the processing of step S1502 and the processing of step S1504, procedure should be moved to the processing of step S1504 in the case where a pin could be acquired and the connection information changing processing should be ended in the case where a pin could not be acquired.

Herein, in parallel design by a plurality of designers, other designers share changed information that a certain designer changed by design work in real-time.

In the explanation below, referring to FIG. 17, processing in which such changed information by each designer is reflected in real-time on terminals of other designers (terminal including a display connected by a network other than a terminal on which a substrate was edited) will be explained.

FIG. 17 shows the explanatory view for explaining a processing of reflecting changed information by each designer in performing parallel design by a plurality of designers on the terminals of other designers.

In such a parallel design by a plurality of designers, firstly, each designer calls out substrate data from a magnetic disc connected on a network in order to edit substrate data, and after that, the substrate data is stored into a memory of each terminal, and each designer edits the substrate data in the memory.

Then, in a predetermined terminal, as a change is performed by a predetermined designer to the multi-board being a design target made up of a plurality of substrates, a memory provided for the predetermined terminal is changed, and as the changed information detecting section 56 detects it, changed information reflecting processing in which changed information is reflected on other terminals is started. Then, by the changed information reflecting processing, the changed information changed by the predetermined designer is output to the terminals of other designers, and substrate data is changed in real-time on the terminals of other designers.

Now, in the explanation below, processing contents of the changed information reflecting processing will be explained using the flowchart of FIG. 18, and as a specific example, a case in which the designer A moved the component "IC1" provided for the substrate A in parallelly designing the multi-board 100 by the designers A, B, C will be explained (refer to FIG. 17).

Figure 18:
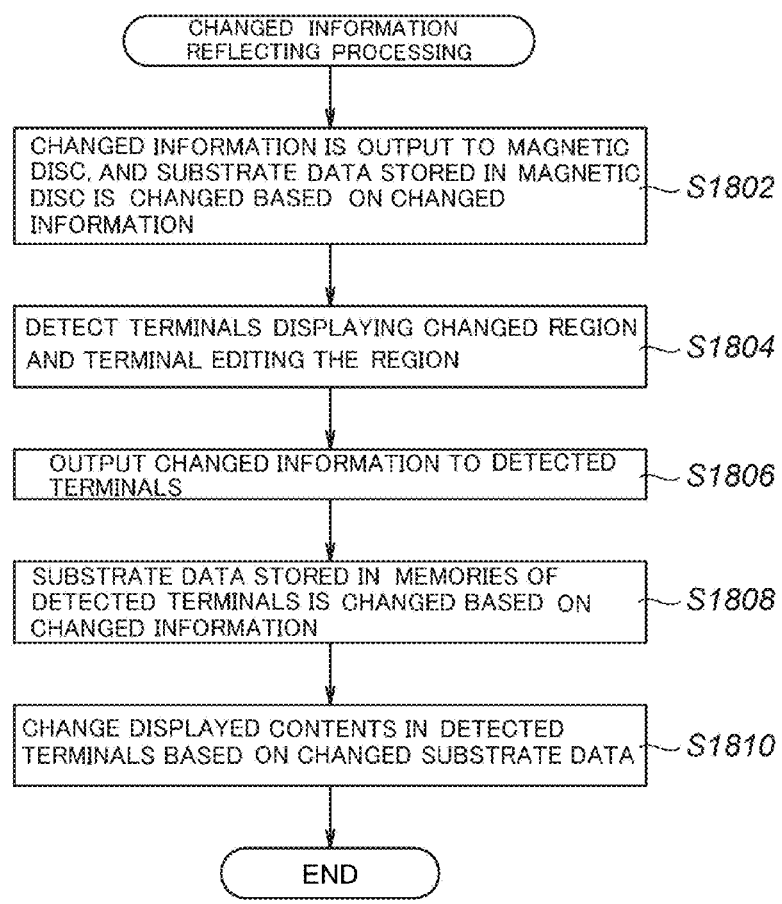
FIG. 18 is a flowchart showing a processing routine of changed information reflecting processing performed in the multi-board design apparatus by the present invention.

Herein, the flowchart of FIG. 18 shows detail processing contents of the changed information reflecting processing, changed information detected by the changed information detecting section 56 is output to the magnetic disc in the changed information reflecting processing first, and the substrate data stored in the magnetic disc is changed based on the changed information (step S1802).

Next, the displayed contents changing section 60 detects a terminal displaying a changed region in a design target and a terminal editing the inside of the region out of terminals other than a predetermined terminal (step S1804).

After that, changed information is output to a terminal detected in the displayed contents changing section 60 (step S1806), and the substrate data stored in a memory of the terminal is changed (step S1808).

Then, by the displayed contents changing section 60, displayed contents is changed based on the changed substrate data in each terminal (i.e., terminal detected in the processing of step S1804) (step S1810).

Specifically, as the component "IC1" arranged for the substrate A is moved to an arrangement position "a" by the designer A, the component "IC1" in the substrate data of the substrate A, which is stored in the memory of the terminal of the designer A, is changed to the arrangement position "a". As the substrate data stored in the memory of the terminal is changed, changed information that the component "IC1" arranged for the substrate A was changed to the arrangement position "a" is detected in the changed information detecting section 56, and the changed information reflecting processing is started.

As the changed information reflecting processing is started, the changed information that the component "IC1" arranged for the substrate A was changed to the arrangement position "a" is output to the magnetic disc by the changed information detecting section 56, and the component "IC1" is changed to the arrangement position "a" in the substrate data of the substrate A in the magnetic disc (processing of step S1802).

Next, in the displayed contents changing section 60, terminals displaying the substrate A and terminals editing the substrate A out of terminals other than the terminal of the designer A are detected (processing of step S1804).

After that, changed information is output to each terminal of the designer B and the designer C which are terminals displaying the substrate A (processing of step S1806), the substrate data of the substrate A stored in the memory of the terminal of the designer B is changed, and the substrate data of the substrate A stored in the memory of the terminal of the designer C is changed (processing of step S1808).

Then, in the terminals of the designer B and the designer C, displayed contents of the substrate A is changed based on the changed substrate data (processing of step S1810).

Herein, in parallelly designing a multi-board being a design target made up of a plurality of substrates by a plurality of designers, each designer is enabled to edit any object of the design target. It is to be noted that the object is a component in the substrate data, a wiring pattern connecting between components, or the like.

Figure 19:
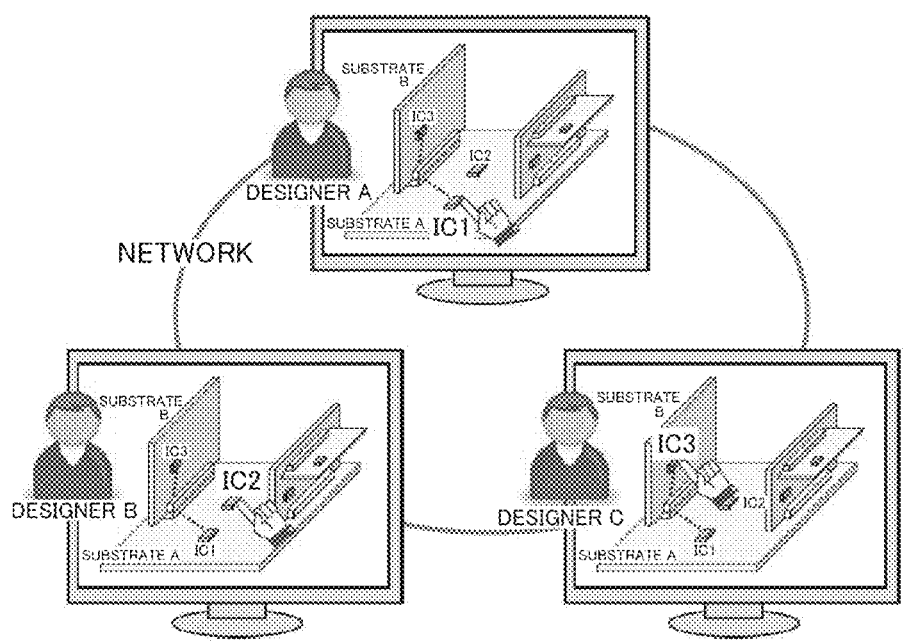
FIG. 19 is an explanatory view showing a state where all designers are capable of performing editing to all substrates in performing parallel design by a plurality of designers in the multi-board design apparatus by the present invention.

For example, when the designer A moves the component "IC1" arranged for the substrate A, the designer B moves a component "IC2" arranged for the substrate A, and the designer C moves a component "IC3" arranged for the substrate B, the designer A and the designer B edit objects on the substrate A being the same substrate, the designer C edits an object on the substrate B, and all designers are enabled to perform editing to all substrates (refer to FIG. 19).

At this point, in the multi-board design apparatus 10, exclusive control in which editing by other designers cannot be performed to an object which is being edited by a predetermined designer is conducted.

Hereinafter, exclusive control in editing the same object by different designers will be explained.

As editing of an object in the substrate data by a designer is started, the editing information that a predetermined designer started editing of a predetermined object in a predetermined terminal is detected in the changed information detecting section 56, and the same object edit-forbidding processing is started to make a state where editing of the same object by different designers is impossible.

Now, in the explanation below, processing contents of the same object edit-forbidding processing will be explained using the flowchart of FIG. 20, and as a specific example, a case where the designer A edits the component "IC1" arranged for the substrate A in parallelly designing the multi-board 100 by the designers A, B, C will be explained (refer to FIG. 21).

Figure 20:
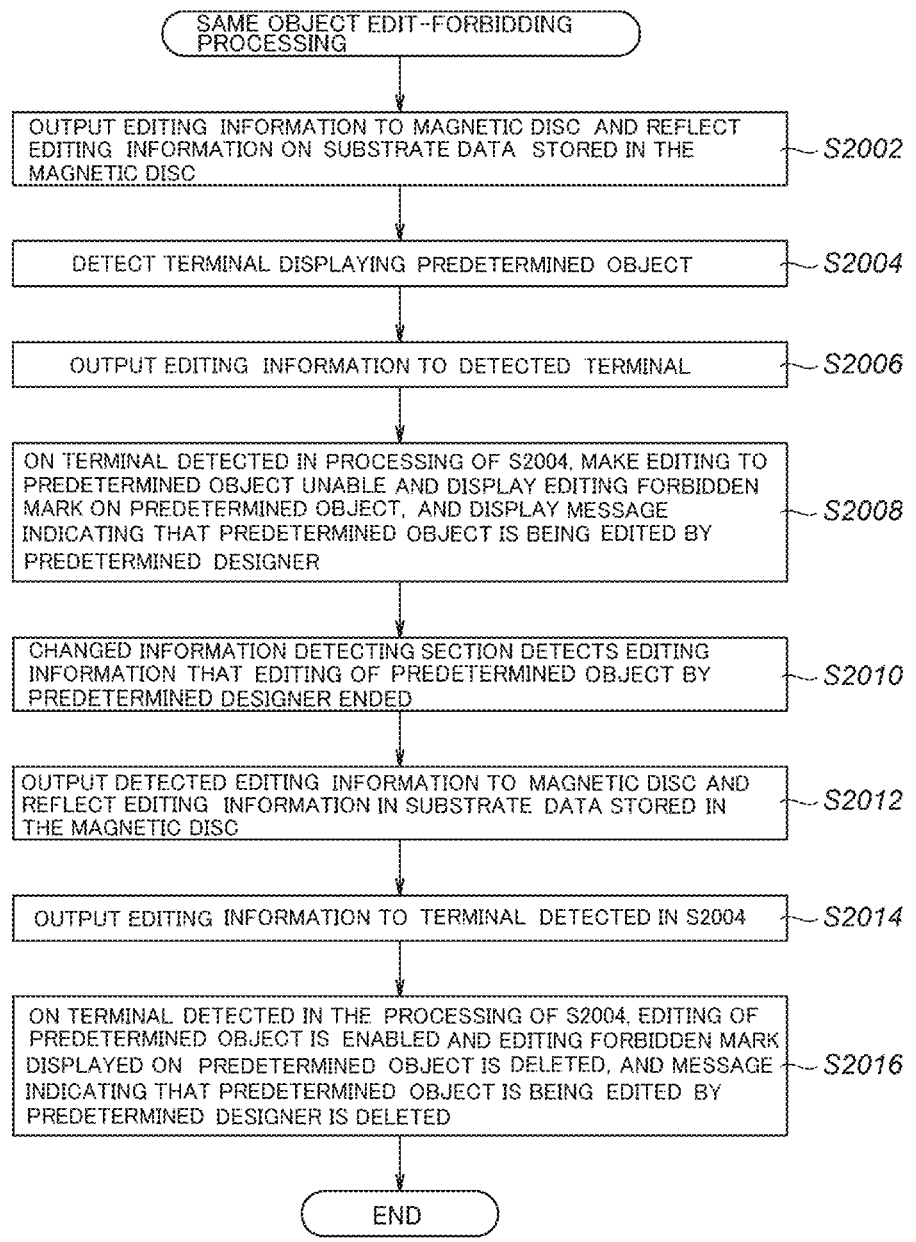
FIG. 20 is a flowchart showing a processing routine of a same object edit-forbidding processing performed in the multi-board design apparatus by the present invention.
Figure 21:
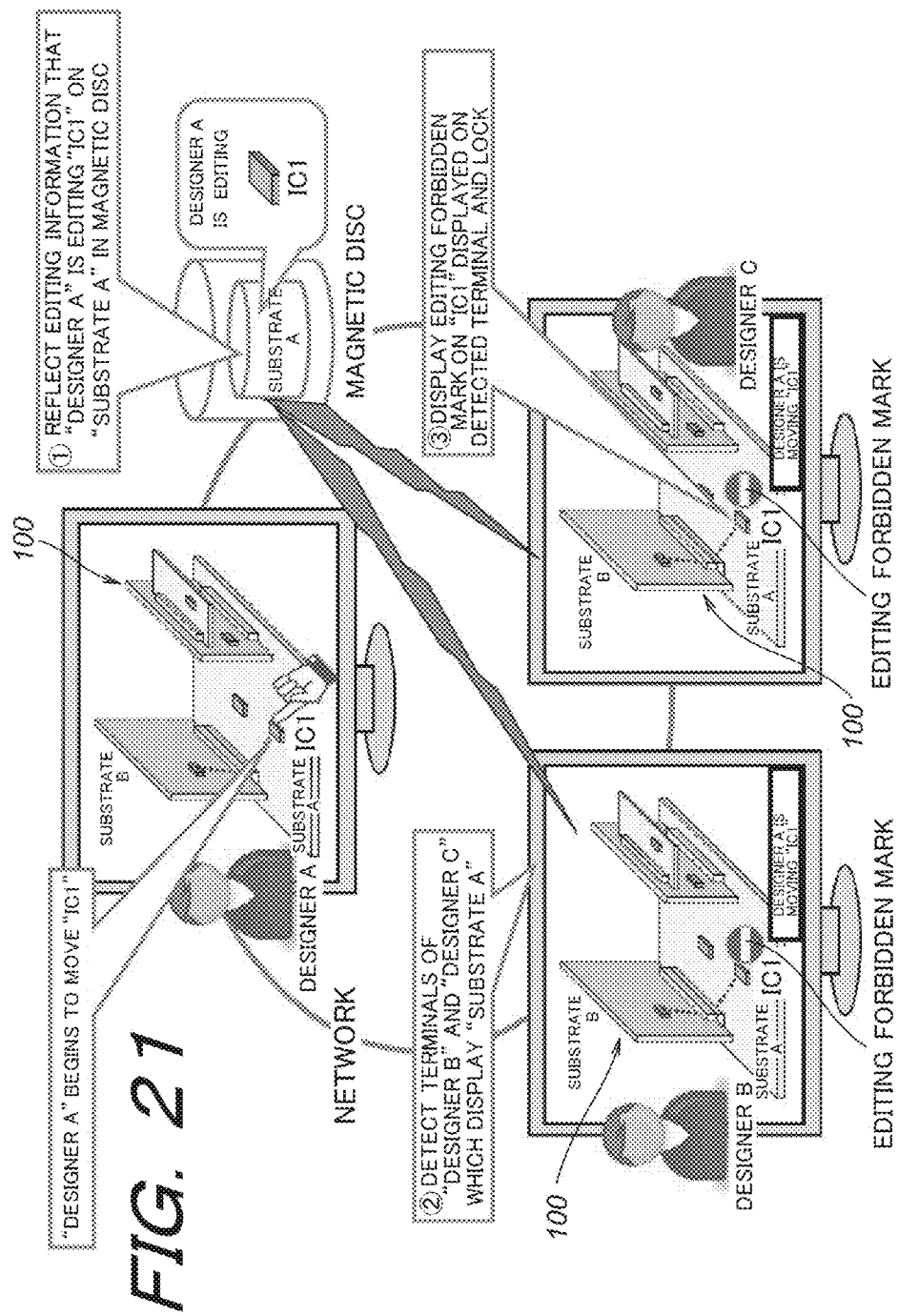
FIG. 21 is an explanatory view showing a state where information that the designer A edited the component "IC1" arranged for the substrate A is output to the terminals of the designer B and the designer C in parallelly designing a multi-board 100 by the designers A, B, C.

Herein, the flowchart of FIG. 20 shows detail processing contents of the same object edit-forbidding processing. In the same object edit-forbidding processing, the detected editing information is output to the magnetic disc first, and the editing information is reflected in the substrate data stored in the magnetic disc (step S2002).

Next, in the displayed contents changing section 60, a terminal displaying a predetermined object out of terminals other than a predetermined terminal is detected (step S2004).

After that, editing information that editing of a predetermined object is started is output to the terminal detected in the displayed contents changing section 60 (step S2006). The terminal is brought to a state where editing to a predetermined object is impossible by the exclusive control section 64 and an editing forbidden mark is displayed on the predetermined object to which editing was started by the displayed contents changing section 60, and the display screen displays that the predetermined object is being edited by the predetermined designer (step S2008).

Then, as editing to the predetermined object on the predetermined terminal by the predetermined designer ends, editing information that editing of the predetermined object by the predetermined designer ended is detected by the changed information detecting section 56 (step S2010), and the detected editing information is output to the magnetic disc, and editing information is reflected in the substrate data stored in the magnetic disc (step S2012).

Then, in the displayed contents changing section 60, the editing information that editing of the predetermined object ended is output to the terminal detected in the processing of step S2004 (step S2014), and in the terminal detected in the processing of step S2004, a predetermined object whose editing was made impossible by the exclusive control section 64 is made editable, and the editing forbidden mark displayed on the predetermined object is deleted by the displayed contents changing section 60, and the display on the display screen that the predetermined object is being edited by the predetermined designer is deleted (step S2016).

Specifically, as editing of the component "IC1" arranged for the substrate A was started by the designer A, editing information that editing of the component "IC1" arranged for the substrate A is started is detected in the changed information detecting section 56, and the same object edit-forbidding processing is started.

As the same object edit-forbidding processing is started, the editing information that editing of the component "IC1" arranged for the substrate A was started is output to the magnetic disc by the changed information detecting section 56 to make a state where editing of the component "IC1" is being processed in the substrate data of the substrate A stored in the magnetic disc (processing of step S2002).

Next, terminals displaying the component "IC1" out of terminals other than the terminal of the designer A are detected in the displayed contents changing section 60 (processing of step S2004).

After that, the editing information that editing of the component "IC1" by the designer A was started is output to each terminal of the designer B and the designer C which are terminals displaying the component "IC1" (processing of step S2006). The terminal of the designer B is brought to a state where editing of the component "IC1" is impossible and the editing forbidden mark is displayed on the component "IC1", and the fact that the component "IC1" is being edited by the designer A is displayed on the lower right of the display screen. Similarly, the terminal of the designer C is brought to a state where editing of the component "IC1" is impossible and the editing forbidden mark is displayed on the component "IC1", the fact that the component "IC1" is being edited by the designer A is displayed on the lower right of the display screen (processing of step S2008).

Thus, regarding the component "IC1" becomes editable only by the designer A, and becomes uneditable by the designer B and the designer C.

After that, as editing to the component "IC1" by the designer A ended, the editing information that editing of the component "IC1" ended by the designer A is detected by the changed information detecting section 56 (processing of step S2010), the detected editing information is output to the magnetic disc to make a state where editing of the component "IC1" processing in the substrate data of the substrate A stored in the magnetic disc ended (processing of step S2012).

Then, in the displayed contents changing section 60, the editing information that editing of the component "IC1" by the designer A ended is output to the terminals of the designer B and the designer C (processing of step S2014) to make a state where the component "IC1" editable in the terminal of the designer B, the editing forbidden mark displayed to the component "IC1" is deleted, and the display that the component "IC1" is being edited by the designer A is deleted from the display screen. Similarly, the component "IC1" is made editable in the terminal of the designer C, the editing forbidden mark displayed to the component "IC1" is deleted, and the display that the component "IC1" is being edited by the designer A is deleted from the display screen (step S2016)

Further, in the multi-board design apparatus 10, in performing parallel design of a multi-board being a design target made up of a plurality of substrates by a plurality of designers, an editing region being a region to which a predetermined designer can edit is designated, and exclusive control in which the designated editing region is editable only by the predetermined designer can be performed.

Figure 22:
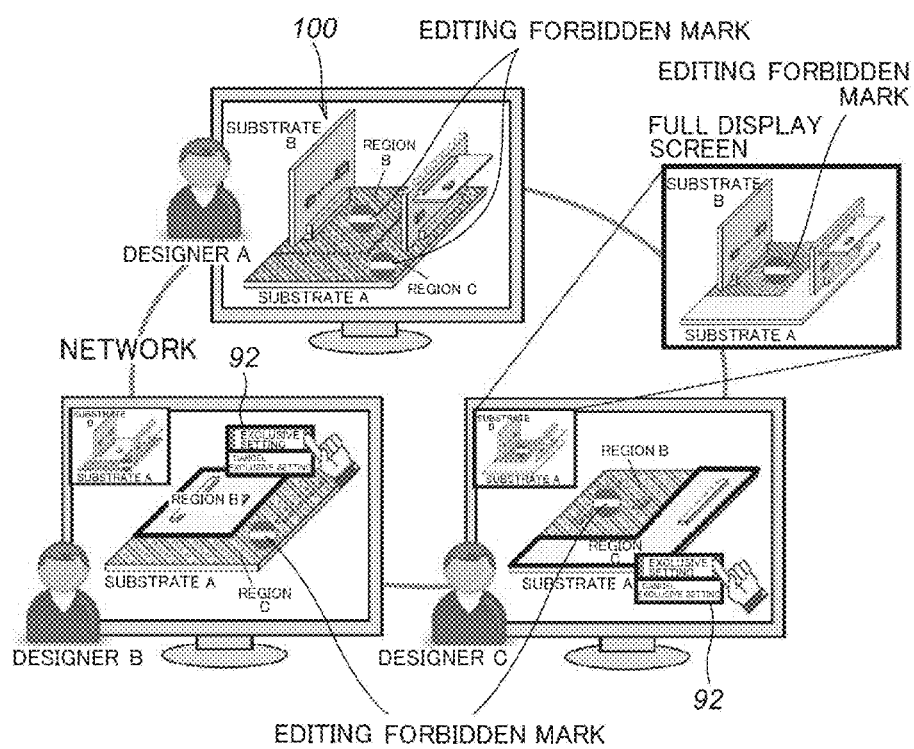
FIG. 22 is an explanatory view showing a state where, in the case where the designer B and the designer C set an editing region in each terminal in parallelly designing a plurality of substrates made up of the multi-board 100 by the designers A, B, C, displayed contents on each terminal is changed based on the contents of the set editing region.

For example, in the case where the designer B and the designer C set an editing region in each terminal in parallelly designing the multi-board 100 made up of a plurality of substrates by the designers A, B, C, displayed contents on each terminal is changed based on the contents of the set editing region (refer to FIG. 22), and a region editable by each designer is set.

Figure 23:
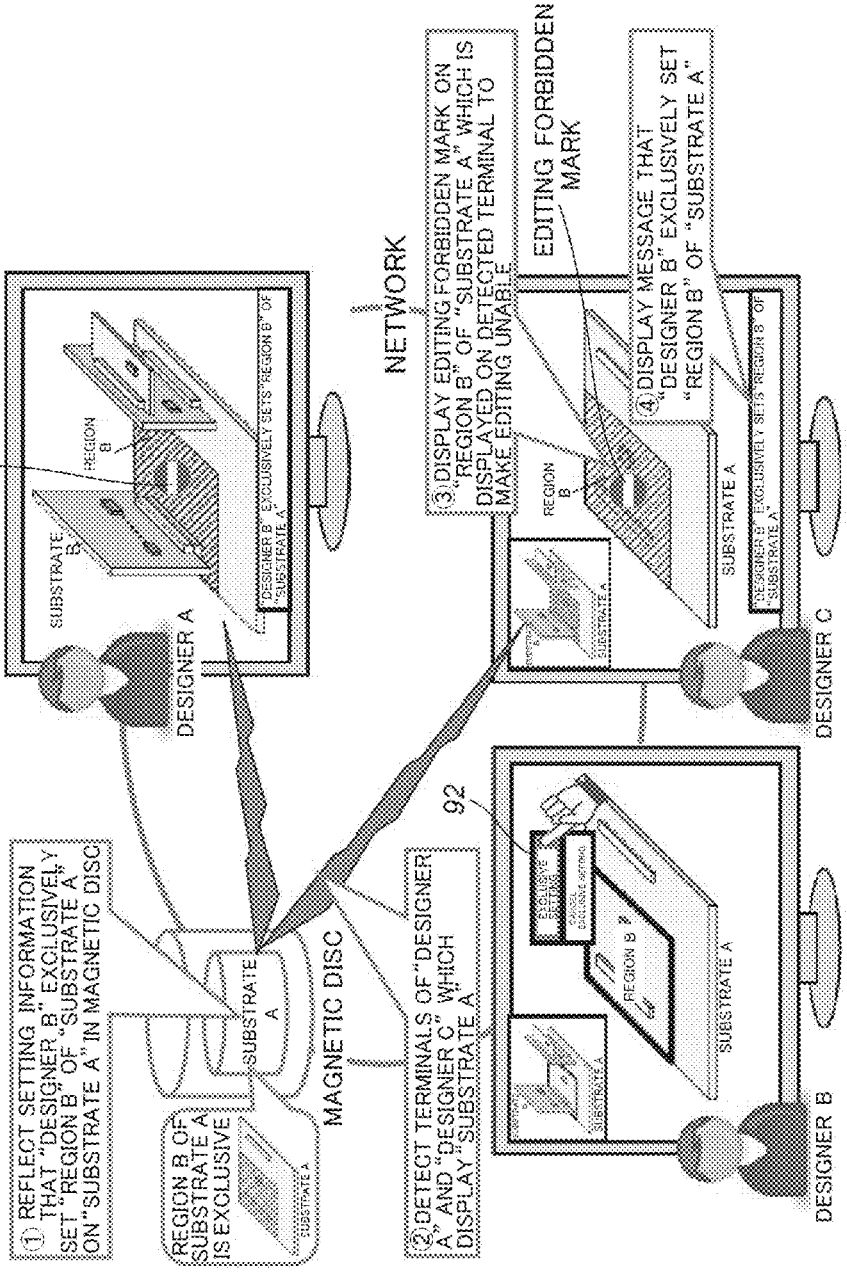
FIG. 23 is an explanatory view showing a state where the designer B exclusively set a region B in parallelly designing the multi-board 100 made up of a plurality of substrates by the designers A, B, C.

Herein, referring to FIG. 23, a case where the designer B set a region editable only by the designer B in the terminal in parallelly designing the multi-board 100 made up of a plurality of substrates by the designers A, B, C will be explained.

As the designer B designates the region B in the substrate A by the pointing device 22 (now such a region may be arbitrarily formed by the pointing device 22, or may also be a previously determined shape), an exclusive setting window 92 is displayed. Then, as the designer B selected "exclusive setting" displayed in the exclusive setting window 92, the region is set as a region editable only by the designer B by the designable region setting section 62 to make a state where the region B is exclusively set by the designer B.

As exclusive setting by the designer B is performed, setting information that the region B of the substrate A was set as an editable region of the designer B is detected in the changed information detecting section 56, and the detected setting information is output to the magnetic disc, and the setting information is reflected on the substrate data of the substrate A stored in the magnetic disc.

In short, the substrate data of the substrate A stored in the magnetic disc is set that the region B is a region editable only by the designer B.

Next, in the displayed contents changing section 60, terminals on which the substrate A is displayed is detected, and the setting information is output to the detected terminal.

Then, on the terminal of the designer A, the region B of the substrate A is hatched, and the editing forbidden mark is displayed on the region B. Thus, the designer A becomes unable to edit the region B of the substrate A. Further, a message indicating that the designer B made exclusive setting to the region B of the substrate A is displayed in the display screen.

Further, in the terminal of the designer B, the outer frame of the region B designated on the substrate A is displayed in a bold line, the region B that the designer B set by himself/herself is displayed in an easily recognizable manner.

Furthermore, in the terminal of the designer C, the region B of the substrate A is hatched, and the editing forbidden mark is displayed on the region B. Thus, the designer C becomes unable to edit the region B of the substrate A. Further, a message indicating that the designer B made exclusive setting to the region B of the substrate A is displayed in the display screen.

After such setting is conducted, editing is performed in a region editable by each designer.

After that, as editing by the designer B ends, the designer B designates the region B to display the exclusive setting window 92, and selects "cancel exclusive setting" displayed in the exclusive setting window 92. Thus, exclusive setting of the region B is cancelled.

As the exclusive setting of the designer B is cancelled, cancelling information that the exclusive setting of the region B of the substrate A was cancelled is detected in the changed information detecting section 56, the detected cancelling information is output to the magnetic disc and the cancelling information is reflected on the substrate data of the substrate A stored in the magnetic disc.

In short, setting that the region B is a region editable only by the designer B is cancelled for the substrate data of the substrate A stored in the magnetic disc.

Then, in the displayed contents changing section 60, terminals on which the substrate A is displayed are detected, and the cancelling information is output to the detected terminals.

Then, on the terminal of the designer A, the hatching performed to the region B of the substrate A is deleted, and the editing forbidden mark displayed on the region B is deleted. Thus, the designer A is enabled to edit the entire substrate A. Further, the message indicating that the designer B made exclusive setting to the region B of the substrate A, which was displayed in the display screen, is deleted.

Further, in the terminal of the designer B, the bold line of the outer frame of the region B designated on the substrate A is deleted, and display of the region B is deleted.

Furthermore, in the terminal of the designer C, hatching performed to the region B of the substrate A is deleted, and the editing forbidden mark displayed on the region B is deleted. Thus, the designer A is enabled to edit the entire substrate A. Further, the message indicating that the designer B made exclusive setting to the region B of the substrate A, which was displayed in the display screen, is deleted.

Now in the exclusively set region, manual editing by a designer other than the designer who made exclusive setting is impossible. However, in the case where a target which is automatically changed by the above-described connection information changing processing exists in the exclusively set region, automatic changing by the connection information changing processing becomes effective.

Further, in the case where a design target is a substrate made up of 8 layers for example, exclusive controlling is also possible by designating layers such that the first to the fourth layers are made editable only by the designer B and the fifth to the eighth layer are made editable only by the designer C, or the like.

As explained above, in the multi-board design apparatus 10 by the present invention, as editing is performed by a designer in a multi-board made up of a plurality of substrates, a connection destination is adapted to be automatically changed such that connection relationship between substrates is maintained as needed.

Further, in the multi-board design apparatus 10 by the present invention, changed information which each designer changed was adapted to be reflected on the terminal of each designer in real-time in parallelly designing a multi-board made up of a plurality of substrates by a plurality of designers.

Furthermore, the multi-board design apparatus 10 by the present invention is adapted to exclusively control a component being edited by a predetermined designer or a region designated by a predetermined designer.

In short, the multi-board design apparatus 10 by the present invention is adapted to reflect information which each designer changed substrate data in real-time on substrate data which other designers display or edit, and automatically change the pin of a connection destination to maintain connection relationship between a plurality of substrate data, in performing parallel design by a plurality of designers.

For this reason, according to the multi-board design apparatus 10 by the present invention, contents which a plurality of designers changed is reflected in real-time on each substrate data and data which each designer is editing, and parallel design by a plurality of designers is made possible while synchronizing data which each designer is editing.

Further, according to the multi-board design apparatus 10 by the present invention, it is possible to perform design while always maintaining connection relationship in each of electrically connected substrate data in a multi-board made up of a plurality of substrates.

Furthermore, even in the case where a plurality of electrically connected substrates is parallelly designed by a plurality of designers, data designed by each designer is always synchronized, so that electrical design can be performed more efficiently.

It is to be noted that the above-described embodiment can be modified as shown in (1) to (10) below.

(1) In the embodiment described above, explanation was made for the case where a design target was the multi-board 100 having a constitution that a plurality of substrates were connected by connectors, but the design target may be constituted of a plurality of substrates, which does not depend on a mounting method, such as a printed circuit board connected by cables and a PonP (Package on Package).

For this reason, an element constituting the layered structure is not only an element which is the printed circuit board, but also arbitrary elements such as a semiconductor package, an IC chip, an interposer substrate, and a layered structure of a multilayer substrate constitute a layered structure, by which it becomes possible to design arrangement of components or the like and wirings.

Specifically, in a design target connected with the substrate A, the substrate B and the substrate C by cables, a constitution information display section 20b displays a layered structure in which the substrate B and the substrate C are constituted in the lower order layer of the substrate A as shown in FIG. 24 (a).

As described, design (editing) of arrangement, wirings or the like is possible for a plurality of substrates connected by cables.

Further, in the design target having the constitution as shown in FIG. 24 (b), the constitution information display section 20b displays a layered structure in which a lower package including an interposer substrate is constituted in the lower order layer of the substrate A, and an IC chip and an upper package are constituted in the lower order layer of the lower package.

As described, design of wirings, arrangement or the like in which the printed circuit board, the semiconductor package and the IC chip (semiconductor) are integrated and a TSV (Through Silicon Via) is used is made possible. It is to be noted that the design target shown in FIG. 24(b) shows a constitution in which wiring is performed from the IC chip to the component on the substrate A through the TSV.

Furthermore, in the design target having the constitution as shown in FIG. 24(c), the constitution information display section 20b displays the layered structure in a constitution that the first to the fourth layers and the fifth to the eighth layers of the substrate A are divided.

As described, design of arrangement, wirings or the like is performed separately for the first to the fourth layers and the fifth to the eighth layers, and after that, the first to the eighth layers are adhered together to design a single substrate.

Specifically, the multi-board design apparatus 10 is capable of performing design without depending on a mounting method (PonP, cable-connected printed circuit board, etc.) or a constituent element (IC chip, semiconductor package, printed circuit board) of the multi-board being a design target.

(2) In the embodiment described above, displayed contents was simply changed to contents changed by other designers in the processing of step S1810 in the changed information reflecting processing. However, at this point, an area changed by other designers may be displayed in a predetermined color or a predetermined mark such as a flag mark may be applied to the area, for example, in changing displayed contents. Furthermore, a message explaining changed points of the displayed contents may be displayed.

Figure 25:
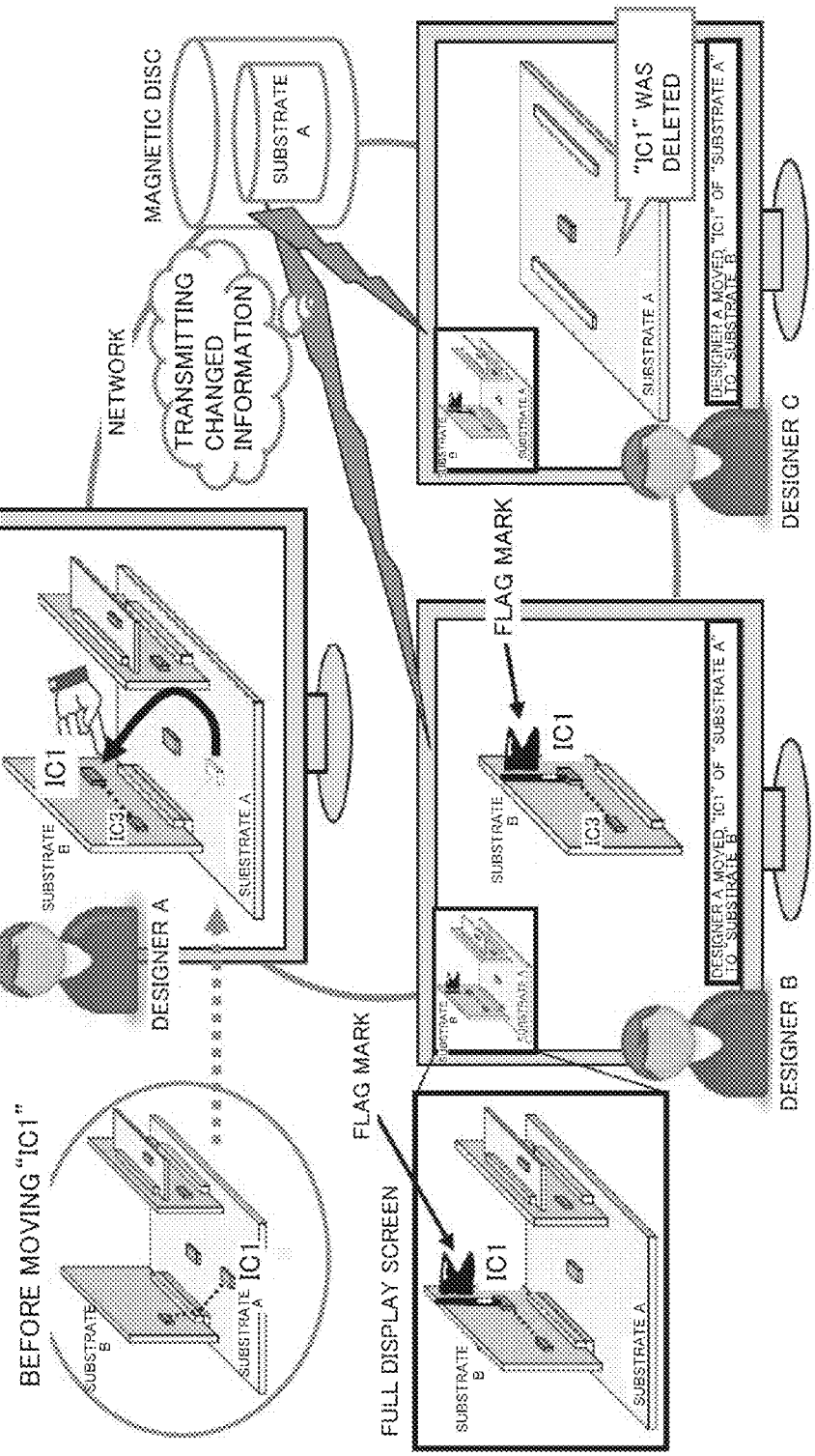
FIG. 25 is an explanatory view showing a state where changed information that the designer A changed the arrangement position of the component "IC1" is reflected on the terminals of the designer B and the designer C, and a mark was added to the reflected information.

Specifically, in the case where the designer A moved the component "IC1" arranged for the substrate A to the substrate B (refer to FIG. 25), as the designer A moved the component "IC1", the terminals of other designers display a flag mark on the moved component "IC1".

On a full display screen displayed on the display screens of the terminals of the designer B and the designer C, a flag mark is displayed on the component "IC1".

Further, the display screen of the designer B also displays a flag mark on the component "IC1" on the substrate B which is being designed. On the other hand, on the display screen of the designer C on which the substrate A is designed, the component "IC1" which moved to the substrate B is deleted from the surface of the substrate A.

Further, on the lower side of the display screen of terminals of the designer B and the designer C, a message indicating that the designer A moved the component "IC1" of the substrate A to the substrate B is displayed.

Now, in the case where the designer A moved the component "IC1" arranged for the substrate A to the substrate B, connection information between the component "IC1" and a component "IC3", in which the components were connected through a connector between the substrate A and the substrate B, is changed to connection information in which the component "IC1" and the component "IC3" were directly connected in the substrate B.

(3) In the embodiment described above, a predetermined designer set a region to which only the predetermined designer performs design in exclusive setting, but it goes without saying that the invention is not limited to them, and a predetermined designer may set a region to which each designer performs design, and each designer may be allowed to perform editing work only in a region set by the predetermined designer.

(4) In the embodiment described above, the editing forbidden mark was displayed on the component or the region to which editing was forbidden, but it goes without saying that the invention is not limited to them, and displayed color of an editing forbidden region may be changed in addition to the editing forbidden mark, or caution may be displayed if a designer who cannot perform editing tries to edit the inside of the editing forbidden region.

Figure 11:
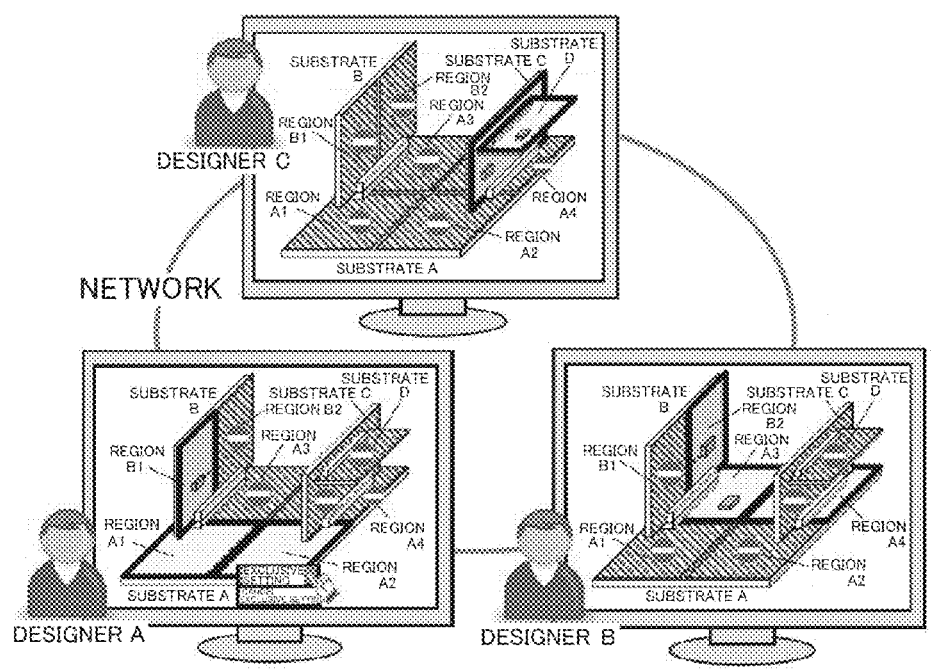
FIG. 11 is an explanatory view showing a state where each operator set partial regions of substrates and substrates in a mixed manner in exclusive setting.

(5) In the embodiment described above, a partial region of the substrate was designated in exclusive setting, but it goes without saying that the invention is not limited to them, and the entire substrate may be designated in exclusive setting (refer to FIG. 26), or a partial region of the substrate and the entire substrate may be designated in a mixed manner (refer to FIG. 11).

Figure 26:
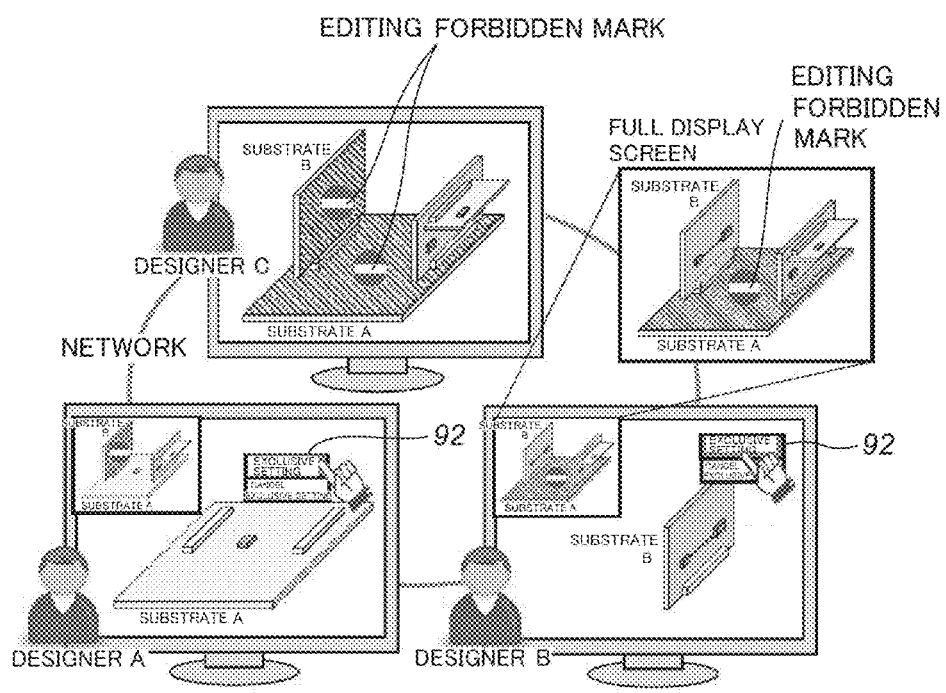
FIG. 26 is an explanatory view showing a state where an operator A exclusively set the substrate A and an operator B exclusively set the substrate B.

Specifically, in the case of setting the entire substrate in exclusive setting, when the designer A exclusively sets the substrate A and the designer B exclusively sets the substrate B in parallelly designing the multi-board 100 made up of a plurality of substrates by the designers A, B, C as shown in FIG. 26 for example, the designer A designates the substrate A first to display the exclusive setting window 92, and "exclusive setting" is selected in the exclusive setting window 92. Thus, only the designer A is enabled to edit the substrate A. Further, the designer B designates the substrate B to display the exclusive setting window 92, and "exclusive setting" in the exclusive setting window 92 is selected, by which the substrate B is set by the designable region setting section 62 as a region editable only by the designer B, and only the designer B is enabled to edit the substrate B.

Then, on the terminal of the designer A, the substrate B is hatched in the overview displaying the multi-board 100, and the editing forbidden mark is displayed on the substrate B.

Further, in the terminal of the designer B, the substrate A is hatched in the overview displaying the multi-board 100, and the editing forbidden mark is displayed on the substrate A.

Furthermore, in the terminal of the designer C, the multi-board 100 is displayed on the display screen so the overview is not displayed, the substrate A and the substrate B are hatched, and the editing forbidden mark is displayed on the substrate A and the substrate B.

Thus, the designer A becomes unable to edit the substrate B and only the designer A is enabled to edit the substrate A, and the designer B becomes unable to edit the substrate A and only the designer B is enabled to edit the substrate B, and the designer C becomes unable to edit the substrate A and the substrate B.

Further, in exclusive setting, in the case where a single designer sets regions for a plurality of substrates or sets a partial region of the substrate and the entire substrate in a mixed manner, for example, in the case where the designer A exclusively sets a region A1 and a region A2 of the substrate A and a region B1 of the substrate B, the designer B exclusively sets a region A3 and a region A4 of the substrate A and a region B2 of the substrate B and the designer C exclusively sets the substrate C and the substrate D in parallelly designing the multi-board 100 made up of a plurality of substrates by the designers A, B, C as shown in FIG. 11, the designer A designates the region A1 and the region A2 of the substrate A and the region B of the substrate B first to display the exclusive setting window 92, and selects "exclusive setting" in the exclusive setting window 92. Thus, by the designable region setting section 62, the region A1 and the region A2 of the substrate A and the region B of the substrate B are set as regions editable only by the designer A, and only the designer A is enabled to edit the region A1 and the region A2 of the substrate A and the region B of the substrate B.

Further, the designer B designates the region A3 and the region A4 of the substrate B and the region B2 of the substrate B to display the exclusive setting window 92, and selects "exclusive setting" in the exclusive setting window 92. Thus, by the designable region setting section 62, the region A3 and the region A4 of the substrate A and the region B2 of the substrate B are set as regions editable only by the designer B, and only the designer B is enabled to edit the region A3 and the region A4 of the substrate A and the region B2 of the substrate B.

Furthermore, the designer C designates the substrate C and the substrate D to display the exclusive setting window 92, and selects "exclusive setting" in the exclusive setting window 92. Thus, by the designable region setting section 62, the substrate C and the substrate D are set as regions editable only by the designer A, and only the designer C is enabled to edit the substrate C and the substrate D.

Then, in the terminal of the designer A, the region A3 and the region A4 of the substrate A, the region B2 of the substrate B, the substrate C and the substrate D are hatched, and the editing forbidden marks are displayed on the region A3 and the region A4 of the substrate A, the region B2 of the substrate B, the substrate C and the substrate D.

Further, in the terminal of the designer B, the region A1 and the region A2 of the substrate A, the region B1 of the substrate B, the substrate C and the substrate D are hatched, and the editing forbidden marks are displayed on the region A1 and the region A2 of the substrate A, the region B1 of the substrate B, the substrate C and the substrate D.

Furthermore, in the terminal of the designer C, the region A1, the region A2, the region A3 and the region A4 of the substrate A, and the region B1 and the region B2 of the substrate B are hatched, and the editing forbidden marks are displayed on the region A1, the region A2, the region A3 and the region A4 of the substrate A, and the region B1 and the region B2 of the substrate B.

Thus, the designer A becomes unable to edit the region A3 and the region A4 of the substrate A, the region B2 of the substrate B, the substrate C and the substrate D, and is enabled to edit only the region A1 and the region A2 of the substrate A and the region B1 of the substrate B.

Further, the designer B becomes unable to edit the region A1 and the region A2 of the substrate A, the region B1 of the substrate B, the substrate C and the substrate D, and is enabled to edit only the region A3 and the region A4 of the substrate A and the region B2 of the substrate B.

Furthermore, the designer C becomes unable to edit the region A1, the region A2, the region A3 and the region A4 of the substrate A and the region B1 and the region B2 of the substrate B, and is enabled to edit only the substrate C and the substrate D.

Now, in the case where a partial region of the substrate and the entire substrate are set in a mixed manner in exclusive setting, it is also possible that a single designer exclusively sets the region and the substrate in a mixed manner such that the designer A designates the region A1 of the substrate A and the substrate C.

Further, as described above, in the case of setting the entire substrate in exclusive setting or setting a partial region of the substrate and the entire substrate in a mixed manner, exclusive setting is realized by the same process as the case of setting a partial region of the substrate in exclusive setting described in the embodiment.

Further, when such a modified example shown in (5) is combined with the modified example described in (1), exclusive control for making regions designated by other designers uneditable can be performed by designating a constituent element of the multi-board (printed circuit board, semiconductor package, IC chip, etc.) or a region on the constituent element.

(6) In the display of the constitution information in the above-described embodiment, the information may be displayed in a simplified manner by using the layered structure showing connection relationship between substrates which constitutes the multi-board such that the designer can instantly check connection relationship between substrates (refer to FIG. 7 (b)).

Specifically, in the case where the substrate A and the substrate B, the substrate A and the substrate C, and the substrate C and the substrate D are electrically connected by the inter-substrate connection information, each of the connected substrate is connected with each other by electrical connecting lines shown by the inter-substrate associating display of FIG. 7 (b), and displayed as the inter-substrate associating display together with the inter-substrate associating information. By displaying the inter-substrate associating display of FIG. 7(b), the designer can instantly check that the substrate A and the substrate B, the substrate A and the substrate C, and the substrate C and the substrate D are electrically connected.

Further, the designer can also instantly check the substrate B and the substrate C, and the substrate B and the substrate D are not electrically connected.

Furthermore, when a predetermined substrate is selected out of the inter-substrate associating display displayed by the designer, this apparatus may display a substrate having electrical connection relationship with the selected substrate in highlight.

(7) In the above-described embodiment, when an object on the design data (i.e., model data) displayed in a three-dimensional shape shown in FIG. 7(b) is selected by the designer, a substrate of the inter-substrate associating display having electrical connection relationship may be displayed in highlight from the inter-substrate connection information or color may be changed or the like.

Thus, when the designer selected an object, he/she can instantly grasp a substrate affecting design.

(8) In the embodiment described above, when a designer selected a substrate to which editing is forbidden and a region on the substrate, the contact information of a designer who is enabled to edit the substrate and a region on the substrate (i.e., name of designer, department of designer, extension number of designer, etc.) may be displayed.

Now in this case, it is necessary to register the contact information of the designer which is displayed in performing exclusive setting by the designer.

(9) The embodiment described above, in performing multi-board designing for designing a multi-board including a plurality of substrates, may be equipped with: editing request detection means for detecting an editing request for a single substrate out of a plurality of substrates (editing request indicates an operation by a designer such as changing an electrical connection destination of a component arranged for a substrate, moving a component, deleting a component, adding a component, etc.); and changing means, in the case where electrical connection relationship in the entire multi-board is changed by editing according to the editing request, for changing design data of other substrates out of the plurality of substrates so as to cancel the change in response to detection by the editing request detection means.

(10) The above-described embodiment and the modified examples shown in the above-described (1) to (9) may be appropriately combined.

INDUSTRIAL APPLICABILITY

The present invention is preferable when used in designing an object to be designed which is constituted of a plurality of substrates.

EXPLANATION OF NUMERICAL CHARACTERS

10 Multi-board design apparatus
12 CPU
14 Bus

16 Storage device
18 Output device
20 Display device
22 Pointing device
24 Character input device
26 I/O
28 External storage device
30 Recording medium
32 Read/write device
50 Inter-substrate associating information creating section
52 Inter-substrate connection information setting section
54 Constitution information setting section
56 Changed information detecting section
58 Connection information changing section
60 Displayed contents changing section
62 Designable region setting section
64 Exclusive control section
66 Constitution information storage section
100 Multi-board

The invention claimed is:

1. A multi-board design apparatus that designs a multi-board in which a plurality of substrates are electrically connected such that an electric circuit including a plurality of components is constituted across the plurality of substrates and a first substrate of the plurality of substrates is connected to a second substrate of the plurality of substrates via a connector, the apparatus comprising:
   a memory that stores a computer executable program; and
   a processor that, when the computer executable program is executed, functions as:
      a changed information detecting section that detects change of electrical connection between a component of the plurality of components, which is mounted on the first substrate, and the connector made by the user; and
      a connection information changing unit that, if the change of the design of the first substrate made by the user is detected, automatically changes design of the second substrate, such that electrical connection relationship of the plurality of components provided across the plurality of substrates before the change of the connection between the component mounted on the first substrate and the connector is maintained.

2. The apparatus according to claim 1, wherein the processor further functions as:
   a component movement detection unit configured to detect an editing request requesting that the component arranged in the first substrate is moved to the second substrate; and
   a substrate connection changing unit configured to change connection relationship between the first substrate and the second substrate such that electrical connection relationship between the plurality of components is maintained before and after an edition made in response to the editing request, based on the detection by the component movement detection means.

3. The apparatus according to claim 1, wherein
   the first substrate has a first pin and a second pin, the second substrate has a third pin and a fourth pin, and
   in a case where a first signal line that has been connected to the first pin is disconnected from the first pin and connected to the second pin in the first substrate in a state that the third pin is connected to the first pin and the fourth pin is connected to the second pin, the changing unit disconnects a second signal line, which has been connected to the third pin, from the third pin and connects to the fourth pin in the second substrate.

4. The apparatus according to claim 1, further comprising:
   a plurality of terminals connected by a network, each of the plurality of terminals including a display, wherein
   the processor further functions as:
      a terminal detection unit configured to detect, when an edition is made to a substrate which constitutes the multi-board by a terminal of the plurality of terminals, a terminal other than the terminal that made the edition; and
      a displayed contents changing unit configured to change displayed contents of the terminal other than the terminal that made the edition, which is detected by the terminal detection, and
   a plurality of designers perform design of the multi-board in parallel by using each terminal.

5. The apparatus according to claim 1, wherein the processor further functions as:
   a connection relationship displaying unit configured to display the electrical connection relationship between the plurality of substrates which constitutes the multi-board by using a layered structure.

6. The apparatus according to claim 1, wherein the processor further functions as:
   a substrate region designating unit configured to designate a substrate which constitutes the multi-board or at least one arbitrary region on a substrate which constitutes the multi-board; and
   a substrate region control unit configured to forbid a designer other than a designer to edit the substrate or the region in order to enable only the editing designer to edit the substrate or the region.

7. The apparatus according to claim 6, wherein the processor further functions as:
   a designer information displaying unit configured to display the information of the editing designer when another designer selects the substrate or the region to which the substrate region control unit forbade a designer other than the editing designer to perform editing.

8. The apparatus according to claim 1, wherein the processor further functions as:
   an object editing detection unit configured to detect editing information associated with that editing of an object in the substrate is started by a editing designer in a substrate of the multi-board; and
   an object control unit configured to forbid a designer other than the editing designer who started the editing of the object in order to enable only the editing designer who started the editing of the object.

9. A multi-board design method of designing a multi-board in which a plurality of substrates are electrically connected such that an electric circuit including a plurality of components is constituted across the plurality of substrates and a first substrate of the plurality of substrates is connected to a second substrate of the plurality of substrates via a connector, the method comprising:
   detecting, by a processor, change of design of a first substrate of the plurality of substrates made by a user; and
   if the change of the design of the first substrate of the plurality of substrates made by the user is detected, automatically changing, by the processor, design of the second substrate of the plurality of substrates, such that electrical connection relationship of the plurality of components provided across the plurality of substrates before the change of the connection between the component mounted on the first substrate and the connector is maintained.

10. A non-transitory computer-readable recording medium recording the program that, when the program is executed, causes a computer to design a multi-board in which a plurality of substrates are electrically connected such that an electric circuit including a plurality of components is constituted across the plurality of substrates and a first substrate of the plurality of substrates is connected to a second substrate of the plurality of substrates via a connector, by:

detecting change of design of a first substrate of the plurality of substrates made by a user;

if the change of the design of the first substrate of the plurality of substrates made by the user is detected, automatically changing design of the second substrate of the plurality of substrates, such that electrical connection relationship of the plurality of components provided across the plurality of substrates before the change of the connection between the component mounted on the first substrate and the connector is maintained.

11. A multi-board design apparatus that designs a multi-board in which a plurality of substrates are electrically connected such that an electric circuit including a plurality of components is constituted across the plurality of substrates and a first substrate of the plurality of substrates is connected to a second substrate of the plurality of substrates via a connector having a plurality of pins, the apparatus comprising:

a memory that stores a computer executable program; and a processor that, when the computer executable program is executed, functions as:

a changed information detecting section that detects change of connection between a first component of the plurality of components, which is mounted on the first substrate, and the connector made by a user, wherein the change of the connection is change from a first connection to a second connection, the first connection is a connection which connects the first component and a first pin of the plurality of pins, and the second connection is a connection which connects the first component and a second pin of the plurality of pins; and a connection information changing unit that, if the change of the design of the first substrate made by a user is detected, automatically changes design of the second substrate such that electrical connection relationship of the plurality of components provided across the plurality of substrates before the change of the connection between the component mounted on the first substrate and the connector is maintained, wherein a second component of the plurality of components, which is mounted on the second substrate and which has been connected to the first pin before the change of the connection, is connected to the second pin by the automatic change.

12. A multi-board design apparatus that designs a multi-board in which a plurality of substrates are electrically connected such that an electric circuit including a plurality of components is constituted across the plurality of substrates and a first substrate of the plurality of substrates is connected to a second substrate of the plurality of substrates via a connector, the apparatus comprising:

a memory that stores a computer executable program and electrical designs of the first and second substrates;

a processor that, when the computer executable program is executed, functions as:

a changed information detecting section that detects change of the electrical design of the first substrate including connection between a component of the plurality of components, which is mounted on the first substrate, and the connector made by a user via a user interface; and a connection information changing unit that, if the change of the electrical design of the first substrate made by the user is detected, automatically generating and applying a change to electrical design of the second substrate based on the change of the electrical design of the first substrate without changing electrical connection relationship of the plurality of components provided across the plurality of substrates; and a display that displays the changed electrical design of the second substrate.

\* \* \* \* \*